US008529266B1

(12) United States Patent
Akin et al.

(10) Patent No.: US 8,529,266 B1
(45) Date of Patent: Sep. 10, 2013

(54) MATHEMATICAL TEACHING APPARATUS AND METHODS

(76) Inventors: Peggy S. Akin, Phoenix, AZ (US); Kimberly A. Rimbey, Glendale, AZ (US)

( * ) Notice: Subject to any disclaimer, the term of this patent is extended or adjusted under 35 U.S.C. 154(b) by 620 days.

(21) Appl. No.: 12/706,475

(22) Filed: Feb. 16, 2010

(51) Int. Cl.
*G09B 19/02* (2006.01)

(52) U.S. Cl.
USPC .......................... 434/191; 434/195; 434/205

(58) Field of Classification Search
USPC .............. 434/188, 191, 200, 204, 205, 207, 434/208; 273/282.1, 293
See application file for complete search history.

(56) References Cited

U.S. PATENT DOCUMENTS

| 3,414,986 | A | * | 12/1968 | Stassen et al. | 434/195 |
|---|---|---|---|---|---|
| 5,238,408 | A | * | 8/1993 | Pollock | 434/208 |
| 5,738,524 | A | * | 4/1998 | Tsao | 434/210 |
| 5,749,734 | A | | 5/1998 | Kohlberg | |
| 5,769,639 | A | * | 6/1998 | Foster | 434/159 |
| 5,980,258 | A | * | 11/1999 | Kohlberg | 434/195 |
| 6,206,701 | B1 | | 3/2001 | Kohlberg | |
| 6,758,675 | B2 | * | 7/2004 | Karabaic | 434/189 |
| 7,052,279 | B1 | * | 5/2006 | Losq | 434/191 |
| 7,104,799 | B1 | * | 9/2006 | Sansing | 434/195 |
| 7,549,865 | B2 | * | 6/2009 | Avery | 434/200 |
| 7,857,315 | B2 | * | 12/2010 | Hoyt | 273/293 |
| 2008/0090213 | A1 | * | 4/2008 | Nguyen | 434/188 |

* cited by examiner

*Primary Examiner* — Peter Egloff
(74) *Attorney, Agent, or Firm* — Parsons & Goltry; Michael W. Goltry; Robert A. Parsons

(57) ABSTRACT

A mathematical teaching apparatus includes a base ten platform formed with a planar array of ten receiving elements being substantially equal in size and arranged in a pattern, and ten counting tiles being substantially equal in size and shape. Each of the ten receiving elements is adapted to removably receive one of the ten counting tiles to arrange the ten counting tiles in the pattern of the ten receiving elements, and a base ten cover is adapted to be removably received upon the ten counting tiles received by the respective ten first receiving elements so as to cover the ten counting tiles.

19 Claims, 14 Drawing Sheets

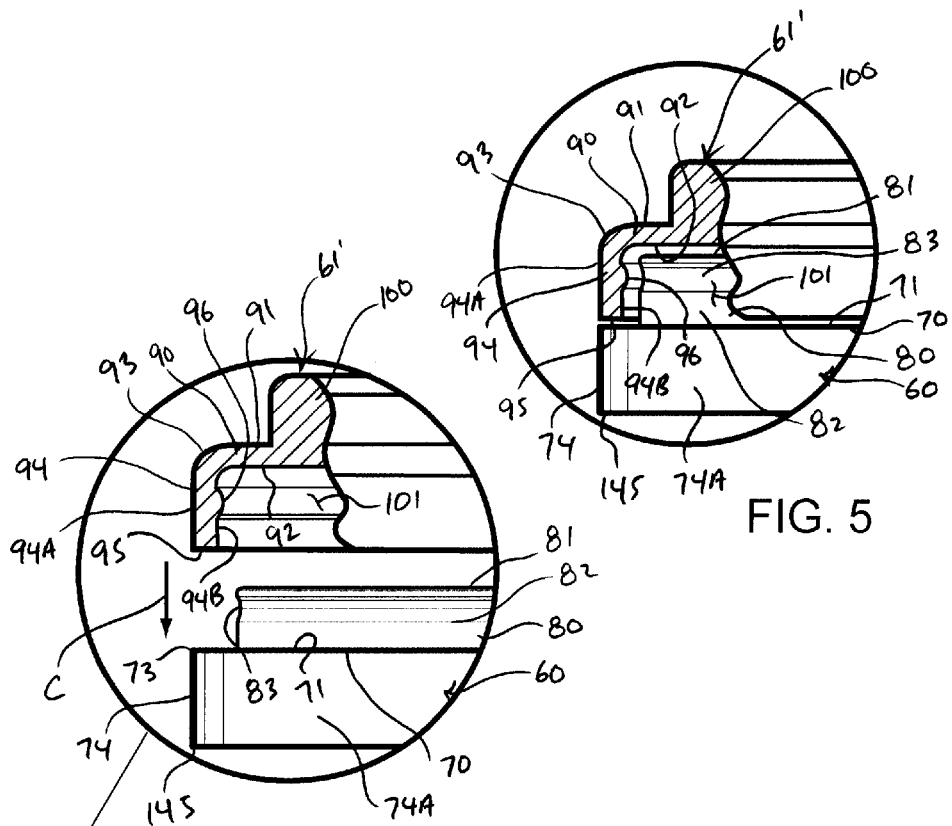
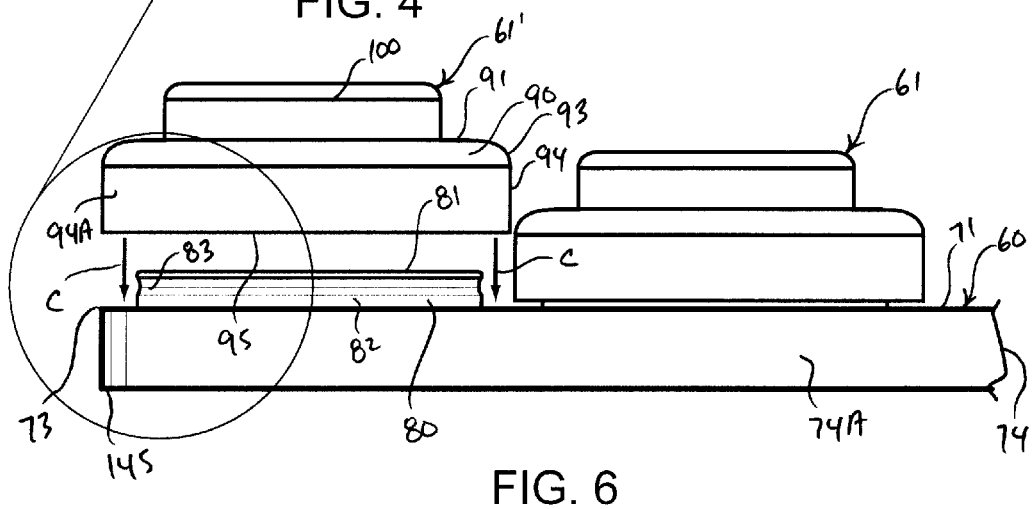

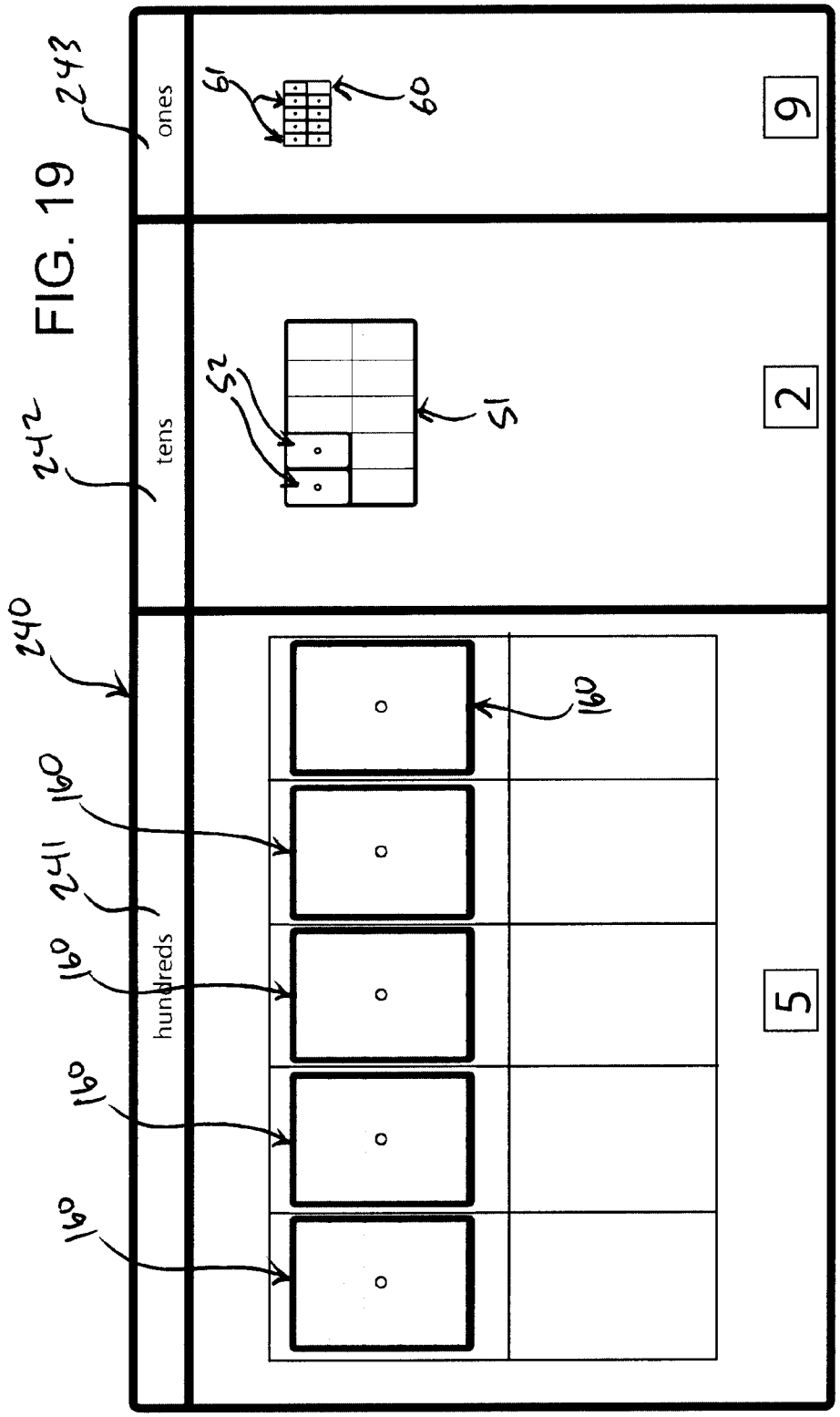

MATHEMATICAL TEACHING APPARATUS AND METHODS

FIELD OF THE INVENTION

The present invention relates to apparatus and methods designed to provide instruction in the field of mathematics.

BACKGROUND OF THE INVENTION

Mathematics encompasses a wide variety of skills and concepts, which are related and often build on one another. The neurodevelopment functions of memory, language, attention, temporal-sequential ordering, higher-order cognition, and spatial ordering also play roles in learning mathematics and must work together for children to succeed in mathematics. Children must be able to use memory to recall rules and formulas and recognize patterns, use language to understand vocabulary, instructions, and to explain their thinking, and use sequential ordering to solve multi-step problems and use procedures. In addition, children must use spatial ordering to recognize symbols and deal with geometric forms. Given that math is cumulative in nature, it is, therefore, important to identify breakdowns and pattern recognition as early as possible, and children must be properly trained to identify broad themes and patterns in mathematics and transfer them within and across situations. Accordingly, there is a need in the art for specialized apparatus and methods useful in demonstrating mathematical breakdowns and patterns for the purpose of developing skills and concepts useful in mathematics learning.

SUMMARY OF THE INVENTION

According to the principle of the invention, a mathematical teaching apparatus includes a base ten platform formed with a planar array of ten receiving elements being substantially equal in size and shape and arranged in a pattern, ten counting tiles, and a base ten cover. The ten counting tiles are substantially equal in size and shape, each of the ten receiving elements is adapted to removably receive one of the ten counting tiles to arrange the ten counting tiles in the pattern of the ten receiving elements, and the base ten cover is adapted to be removably positioned upon the ten counting tiles received by the respective ten first receiving elements so as to cover the ten counting tiles. First indicia is applied to the base ten platform identifying the base ten platform, second indicia is applied to each of the ten counting tiles identifying each of the ten counting tiles, and third indicia is applied to the base ten cover identifying the base ten cover. According to the principle of the invention, the first indicia is different from the second indicia and the third indicia, the second indicia is different from the first indicia and the third indicia, and the third indicia is different from the first indicia and the second indicia. The pattern of the ten receiving elements of the base ten platform is opposite parallel rows of five of the receiving elements. A detent engagement pair is formed between each receiving element and each counting tile to detachably secure each counting tile to a respective receiving element. Each detent engagement pair includes an element of the detent engagement pair carried by each counting tile and a complementing element of the detent engagement pair carried by each receiving element. The element of the detent engagement pair is one of a recess and a detent, and the complementing element of the engagement pair is the other of the recess and the detent.

According to the principle of the invention, a mathematical teaching apparatus includes a base ten platform formed with a planar array of ten receiving elements being substantially equal in size and shape and arranged in a pattern, ten counting tiles, and a base ten cover. The counting tiles are substantially equal in size and shape. Each of the ten receiving elements is adapted to removably receive one of the ten counting tiles to arrange the ten counting tiles in the pattern of the ten receiving elements. According to the invention, the ten counting tiles are removably received by the respective ten receiving elements arranging the ten counting tiles in the pattern of the ten receiving elements. The base ten cover is removably received upon and supported by the ten counting tiles forming a base ten counting unit comprising the base ten cover removably received upon and supported by the ten counting tiles removably received by the respective ten receiving elements of the base ten platform, and a gap formed between the base ten cover and the base ten platform exposing the ten counting tiles therebetween the base ten cover and the base ten platform. First indicia is applied to the base ten platform identifying the base ten platform, second indicia is applied to each of the ten counting tiles identifying each of the ten counting tiles, and third indicia is applied to the base ten cover identifying the base ten cover. According to the principle of the invention, the first indicia is different from the second indicia and the third indicia, the second indicia is different from the first indicia and the third indicia, and the third indicia is different from the first indicia and the second indicia. The first indicia of the base ten platform, the second indicia of each of the ten counting tiles, and the third indicia of the base ten cover are each readily visible with respect to each other in the base ten counting unit. The pattern of the ten receiving elements of the base ten platform is opposite parallel rows of five of the receiving elements, wherein the ten counting tiles removably received by the respective ten receiving elements are arranged in opposite parallel rows of five of the counting tiles according to the pattern of the ten receiving elements. A detent engagement pair is formed between each receiving element and each counting tile detachably securing each counting tile to a respective receiving element. Each detent engagement pair includes an element of the detent engagement pair carried by each counting tile engaging a complementing element of the detent engagement pair carried by each receiving element. The element of the detent engagement pair is one of a recess and a detent, and the complementing element of the engagement pair is the other of the recess and the detent.

According to the principle of the invention, a mathematical teaching apparatus includes ten base ten counting units and a base hundred platform. Each base ten counting unit includes a base ten platform formed with a first planar array of ten first receiving elements being substantially equal in size and shape and which are arranged in a pattern, ten counting tiles being substantially equal in size and shape, a base ten cover, each of the ten first receiving elements adapted to removably receive one of the ten counting tiles to arrange the ten counting tiles in the first pattern of the ten first receiving elements, the ten counting tiles removably received by the respective ten first receiving elements arranging the ten counting tiles in the first pattern of the ten first receiving elements, and the base ten cover removably received upon and supported by the ten counting tiles forming the base ten counting unit including the base ten cover removably received upon and supported by the ten counting tiles removably received by the respective ten first receiving elements of the base ten platform, and first a gap formed between the base ten cover and the base ten platform exposing the ten counting tiles therebetween the base ten cover and the base ten platform. The base hundred platform is formed with a second planar array of ten second receiving elements being substantially equal in size and shape and which are arranged in a second pattern. The ten second receiving elements of the base hundred platform are each adapted to removably receive the base ten platform of one of the ten base ten counting platforms to arrange the ten base ten counting units in the first pattern of the ten first receiving elements. According to the principle of the invention, the ten base ten platforms of the ten base ten counting units are removably received by the respective ten second receiving elements of the base hundred platform arranging the ten base ten counting units in the second pattern of the ten second receiving elements of the base hundred platform. First indicia is applied to each base ten platform identifying each base ten platform, second indicia is applied to each counting tile identifying each counting tile, and third indicia is applied to each said base ten cover identifying each said base ten cover. According to the principle of the invention, the first indicia is different from the second indicia and the third indicia, the second indicia is different from the first indicia and the third indicia, the third indicia is different from the first indicia and the second indicia, and the first indicia of the base ten platform, the second indicia of each of the counting tiles, and the third indicia of the base ten cover of each base ten counting unit are readily visible in each base ten counting unit. Fourth indicia is applied to the base hundred platform, and the fourth indicia is different from the first indicia, the second indicia, and the third indicia. The first pattern is opposite parallel rows of five first receiving elements, and the ten counting tiles removably received by the respective ten first receiving elements of the base ten platform of each base ten counting unit are arranged in opposite parallel rows of five counting tiles according to the first pattern of the ten first receiving elements. The second pattern is opposite parallel rows of five second receiving elements, and the ten base ten platforms of the ten base ten counting units removably received by the respective ten second receiving elements of the base hundred platform are arranged in opposite parallel rows of five base ten counting units according to the second pattern of the ten second receiving elements. A first detent engagement pair is formed between each first receiving element and each counting tile detachably securing each counting tile to a respective first receiving element. Each first detent engagement pair includes a first element of the first detent engagement pair carried by each counting tile engaging a first complementing element of the first detent engagement pair carried by each first receiving element. A second detent engagement pair is formed between each second receiving element and each base ten platform detachably securing each base ten platform to a respective second receiving element. Each second detent engagement pair includes a second element of the second detent engagement pair carried by each base ten platform engaging a second complementing element of the second detent engagement pair carried by each second receiving element. There is also a base hundred cover. The base hundred cover is removably positioned upon and supported by the base ten covers of the base ten counting units forming a base hundred counting unit consisting of the base hundred cover removably received upon and supported by the base ten covers of the base ten counting units removably received by the respective ten second receiving elements of the base hundred platform, and a second gap formed between the base hundred cover and the base hundred platform exposing the ten base ten counting units therebetween the base hundred cover and the base hundred platform. Fifth indicia is applied to the base hundred cover, and the fifth indicia is different from the first indicia, the second indicia, the third indicia, and the fourth indicia.

BRIEF DESCRIPTION OF THE DRAWINGS

Referring to the drawings:

FIG. 4 is an enlarged, exploded, fragmented vertical sectional view of a counting tile and a receiving element of a base ten platform of a mathematical teaching apparatus constructed and arranged in accordance with the principle of the invention;

FIG. 5 is an enlarged, fragmented vertical section view of a counting tile and a receiving element of a base ten platform of a mathematical teaching apparatus constructed and arranged in accordance with the principle of the invention shown assembled;

FIG. 6 is a fragmented side elevation view of a base ten platform of a mathematical teaching apparatus constructed and arranged in accordance with the principle of the invention with one counting tile shown installed with respect to the base ten platform and another counting tile shown separated with respect to the base ten platform prior to installation;

FIG. 19 is a top plan view of a patterning platform constructed and arranged in accordance with the principle of the invention.

DETAILED DESCRIPTION

Figure 1:
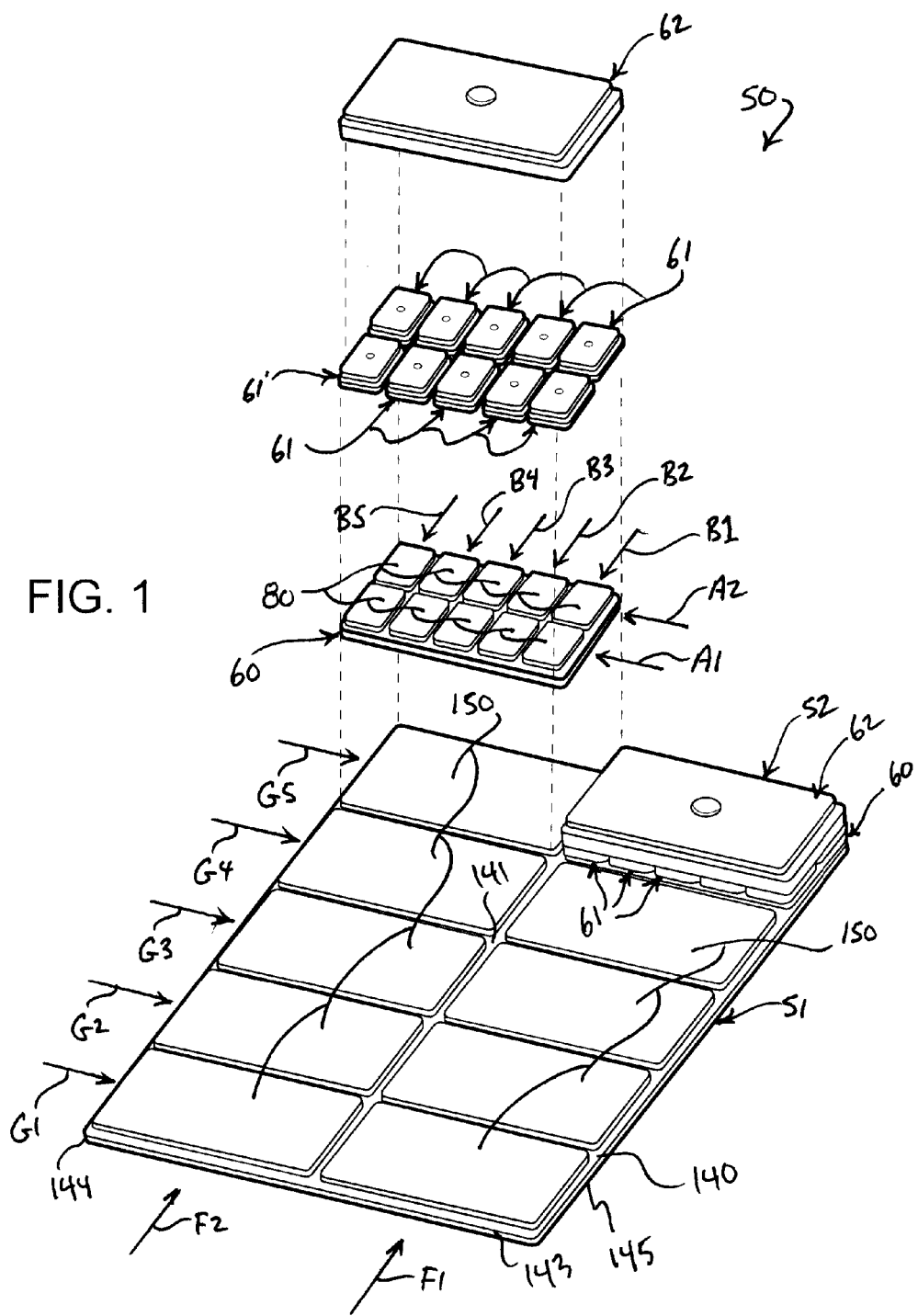
FIG. 1 is a perspective view of a mathematical teaching apparatus constructed and arranged in accordance with the principle of the invention including a base hundred platform, a base ten counting unit applied to the base hundred platform, and another base ten counting unit shown exploded with respect to the base hundred platform illustrating a base ten platform, counting tiles, and a base ten cover.
Figure 8:
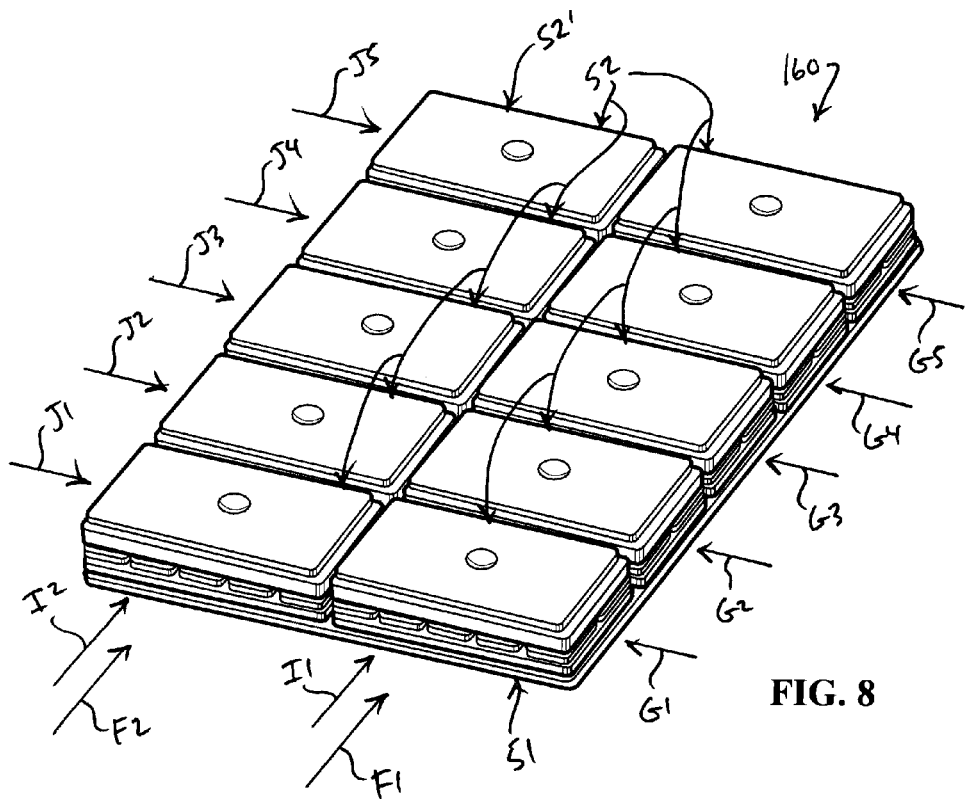
FIG. 8 is a perspective view of a base hundred platform filed with base ten counting units of a mathematical teaching apparatus constructed and arranged in accordance with the principle of the invention.

Turning now to the drawings, in which like reference characters indicate corresponding elements throughout the several views, attention is directed to FIG. 1 illustrating a mathematical teaching apparatus 50 constructed and arranged in accordance with the principle of the invention including, as illustrated, a base hundred platform 51, a base ten counting unit 52 applied to base hundred platform 51, and another base ten counting unit 52 shown in exploded view with respect to base hundred platform 51. Apparatus 50 incorporates ten base ten counting units 52 as shown in FIG. 8, each of which are adapted to be removably received by or otherwise upon base hundred platform 51 as shown in FIG. 8 so as to be supported by base hundred platform 51 in a predetermined pattern according to the structure of base hundred platform 51. Only two counting units 52, one assembled and positioned upon base hundred platform 51 and one exploded with respect to base hundred platform 51, are shown in FIG. 1 for illustrative purposes. Base ten counting units 52 are each identical in structure and function, and the details of one such base ten counting unit, which is denoted in FIGS. 1-3 with the reference character 52', will now be discussed in detail, with the understanding that the ensuing description of base ten counting unit 52' applies in every respect to each of the base ten counting units 52 of apparatus 50.

Base ten counting unit 52' consists of a base ten platform 60 adapted to be removably positioned on or otherwise received by or upon base hundred platform 51, ten counting tiles 61 adapted to be removably positioned on or otherwise received by or upon base ten platform 60, and a base ten cover 62 adapted to be removably positioned upon or otherwise received by or upon counting tiles 61 received by base ten platform 60. Base ten platform 60, counting tiles 61, and base ten cover 62 are each formed of plastic or other strong, resilient material or combination of materials, and are each preferably integrally formed, such as through molding or machining.

Figure 3:
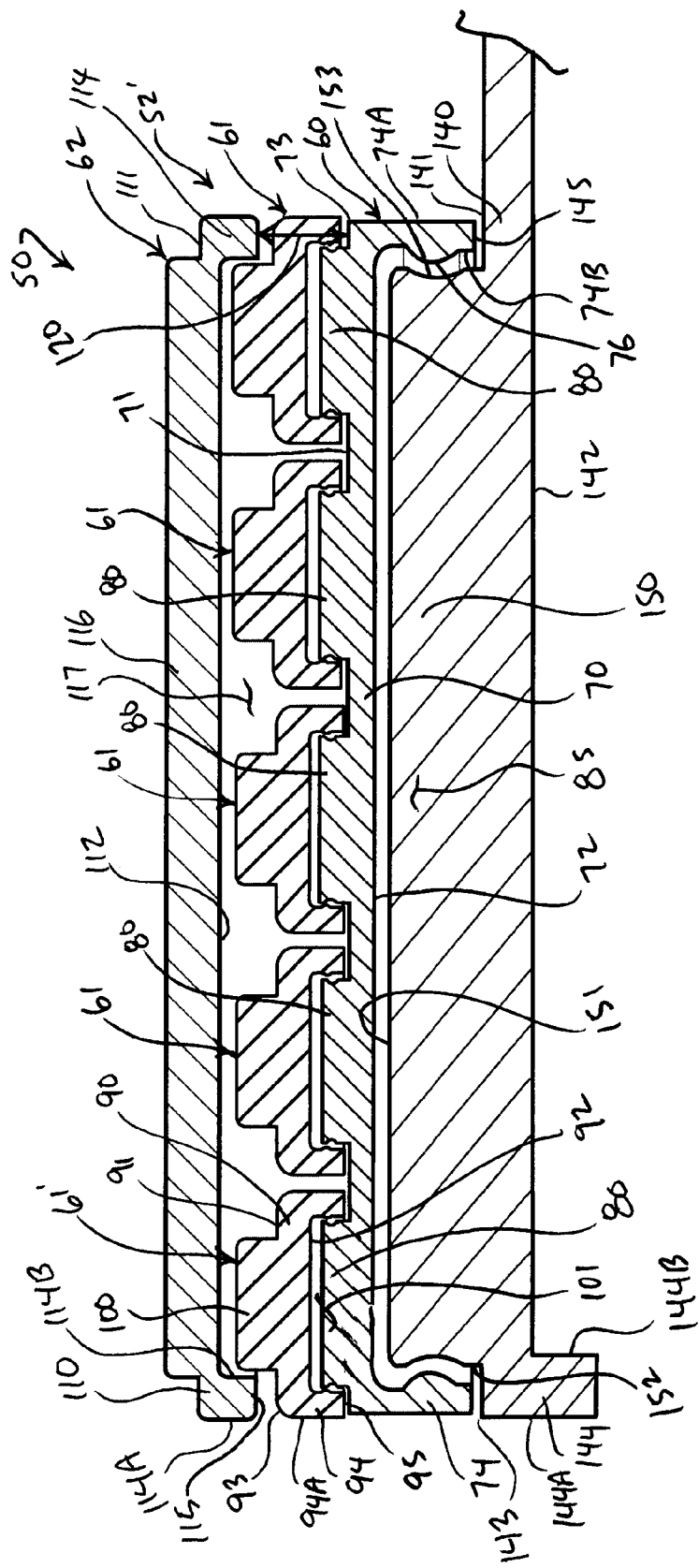
FIG. 3 is a vertical section view of a base ten counting unit and a receiving element of a base hundred platform of a mathematical teaching apparatus constructed and arranged in accordance with the principle of the invention shown assembled.

Base ten platform 60 and base ten cover 62 are each broad and generally flat and substantially rectangular in shape in the present embodiment and are substantially coextensive with respect to each other. As best illustrated in FIG. 3, base ten platform 60 includes a horizontal main panel 70 having opposed, parallel, and planar upper and lower surfaces 71 and 72, a perimeter edge 73, and a continuous sidewall 74 depending downwardly from perimeter edge 73 and lower surface 72 terminating with a continuous lower edge 75. Continuous sidewall 74 has an outer surface 74A and an opposed inner surface 74B formed with an inwardly projecting detent denoted at 76.

Figure 2:
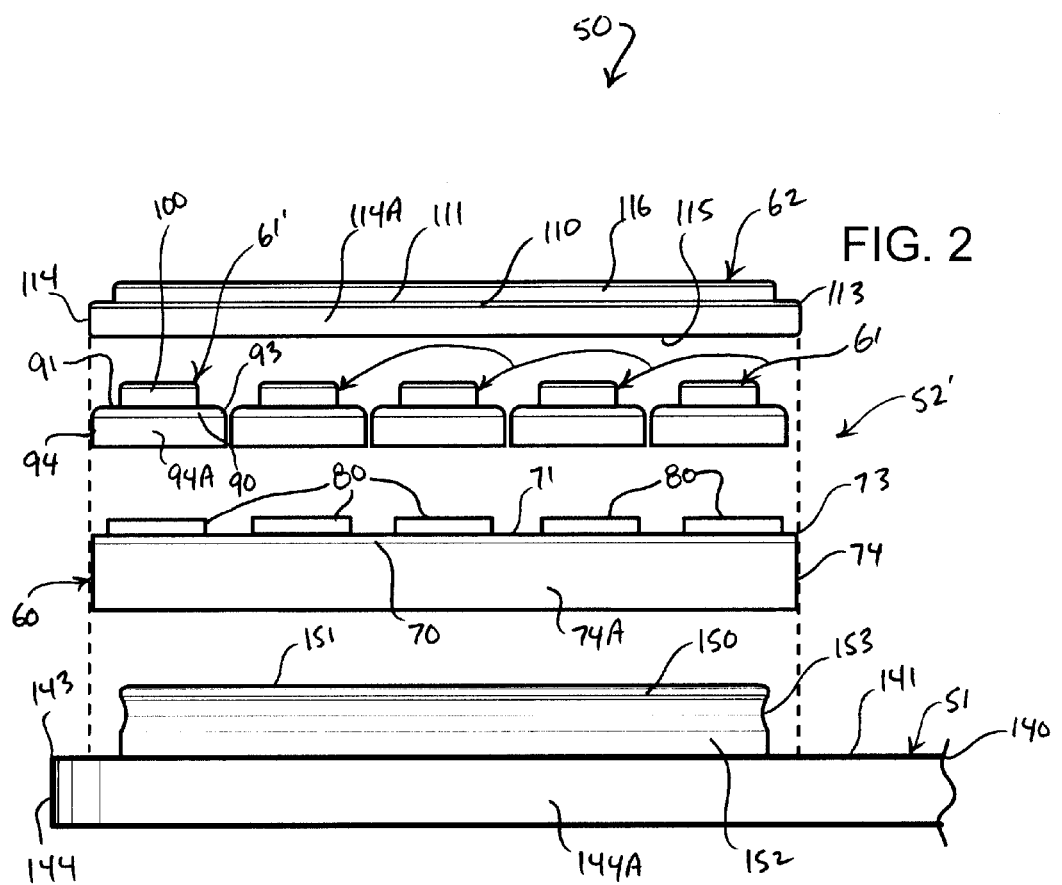
FIG. 2 is an exploded perspective view of a base ten counting unit and a receiving element of a base hundred platform of a mathematical teaching apparatus constructed and arranged in accordance with the principle of the invention.

Referencing FIGS. 2 and 3, upper surface 71 of main panel 70 is formed with receiving elements each denoted 80. Receiving elements 80 are substantially equal in size and shape, and, in the present embodiment, are upstanding projections that are broad and flat and generally rectangular in shape and that extend upwardly from and with respect to upper surface 71 of main panel 70 each terminating with an outer end or extremity 81. Receiving elements 80 each have a perimeter outer surface 82 extending between upper surface 71 of main panel 70 and upper end 81, and a recess 83 is formed in outer perimeter surface 81 of each receiving element 80. Receiving elements 80 are substantially equally spaced apart and formed and arranged in a planar array and in a pattern as shown. A receiving area, depression, or socket 85 is formed in base ten platform 60, which underlies receiving elements 80 and which is formed by and between lower surface 72 of main panel 70 and inner surface 74B of sidewall 74. Receiving area 85 is generally rectangular in shape.

Receiving elements 80 are each adapted and arranged to removably receive or otherwise accommodate a counting tile 61. Base ten platform 60 has ten receiving elements 80, and each receiving element 80 is a designated position for a counting tile 61. Each counting tile 61 represents the numerical value of one, according to the principle of the invention. Because base ten counting unit 52' incorporates ten counting tiles 61, base ten counting unit 52', like each base ten counting unit 52, represents the numerical value of ten with ten installed counting tiles 61, which number ten is a fundamental numerical value according to the invention around which apparatus 50 is structured to represent numerical patterns and relationships.

And so referencing FIG. 1, base ten platform 60 is formed with ten receiving elements 80 each adapted to receive a counting tile 61, and base ten platform 60 is thus configured to receive thereon a total of ten counting tiles 61. The pattern of the ten receiving elements 80 as illustrated represents factors of the fundamental numerical value of ten provided by apparatus 50. The preferred pattern of the ten receiving elements 80 of base ten platform 60 representing factors of ten is, according to the principle of the invention, two opposite parallel rows of five of the receiving elements 80, wherein the ten counting tiles 61 removably received by the respective ten receiving elements 80 are arranged in corresponding two opposite parallel rows of five of the counting tiles 61 according to the pattern of the ten receiving elements 80. As a matter of identifying the pattern of receiving elements 80 of base ten platform 60 as illustrated in FIG. 1, the two rows of five receiving elements 80 are denoted at arrowed lines A1 and A2, respectively. Because rows A1 and A2 are opposite and parallel with respect to each other, the pattern of the receiving elements 80 of base ten platform 60 also forms five parallel rows of two opposite receiving elements 80, which five rows of two opposite receiving elements 80 are identified by arrowed lines B1-B5, and which are transverse with respect to rows A1 and A2, and this structural arrangement is clearly shown in FIG. 1. According to the principle of the invention, the five parallel rows B1-B5 of two opposite receiving elements 80 each represent a factor of ten being the fundamental numerical element of value of apparatus 50.

Counting tiles 61 are each identical in structure and function, and the details of one such counting tile 61, which is denoted in FIGS. 1-3 with the reference character 61', will now be discussed in detail, with the understanding that the ensuing description of counting tile 61' applies in every respect to each of the counting tiles 61 of apparatus 50. Counting tile 61' is considerably smaller in size compared to base ten platform 60 and to base ten cover 62 and is, more particularly, approximate one-tenth the size of base ten platform 60 and of base ten cover 62. Counting tile 61' is substantially rectangular in shape, and, as best illustrated in FIG. 3, includes a horizontal main panel 90 having opposed, parallel, and planar upper and lower surfaces 91 and 92, a perimeter edge 93, and, with additional reference to FIG. 4, a continuous sidewall 94 depending downwardly from perimeter edge 93 and lower surface 92 terminating with a continuous lower edge 95. Continuous sidewall 94 has an outer surface 94A and an opposed inner surface 94B formed with an inwardly projecting detent denoted at 96. Upper surface 91 is formed with a head 100, which is a broad upstanding projection that is flat and generally rectangular in shape and that extends upwardly from and with respect to upper surface 91 of main panel 90. A receiving area, depression, or socket 101 is formed in counting tile 61', which underlies head 100 and which is formed by and between lower surface 92 of main panel 90 and inner surface 94B of sidewall 94. Receiving area 101 is generally rectangular in shape and is, moreover, substantially commensurate in shape with respect to each receiving element 80 formed in base ten platform 60 and is sized to receive therein each receiving element 80 formed in base ten platform 60.

To install counting tile 61' onto base ten platform 60, counting tile 61' is positioned opposite to one of the receiving elements 80 formed in upper surface 71 of main panel 70 of base ten platform 60 as shown in FIGS. 2, 4, and 6 registering receiving area 101 of counting tile 61' with the corresponding receiving element 80 as shown in FIG. 4. Counting tile 61' is then moved downwardly in the direction indicated by arrowed lines C in FIGS. 4 and 6 toward receiving element 80 applying the corresponding receiving element 80 into receiving area 101 formed in counting tile 61' as shown in FIGS. 3 and 5 and directing continuous lower edge 95 upon and against upper surface 71 of main panel 70 of base ten platform 60. So installed, counting tile 61' is supported by base ten platform, in which lower surface 92 of counting tile 61' is directed toward and confronts outer end 81 of the corresponding receiving element 80, inner surface 94B of continuous sidewall 94 encircles, and is positioned in juxtaposition with respect to, perimeter outer surface 82 of the corresponding receiving element 80, and detent 96 formed in inner surface 94B of continuous sidewall 94 is registered with and received by recess 83 formed in perimeter outer surface 81 of the corresponding receiving element 80 thereby snappingly and captively retaining counting tile 61' to the corresponding receiving element 80 as illustrated in FIGS. 3 and 5. To remove counting tile 61' from the corresponding receiving element 80, counting tile 61' need only be taken up, such as by hand, and pulled away from the corresponding receiving element 80 to detach detent 96 from recess 83 and separate counting tile 61' from base ten platform 60.

Detent 96 and recess 83 form a detent engagement pair between counting tile 61' and the corresponding receiving element 80 operable for detachably securing counting tile 61' to the corresponding receiving element 80. Detent 96 forms an element of the detent engagement pair, and the corresponding recess 83 forms the complementing element of the detent engagement pair. Although detent 96 is formed in counting tile 61' and the corresponding recess 83 is formed in the corresponding receiving element 80, this arrangement or positioning can be reversed.

Figure 7:
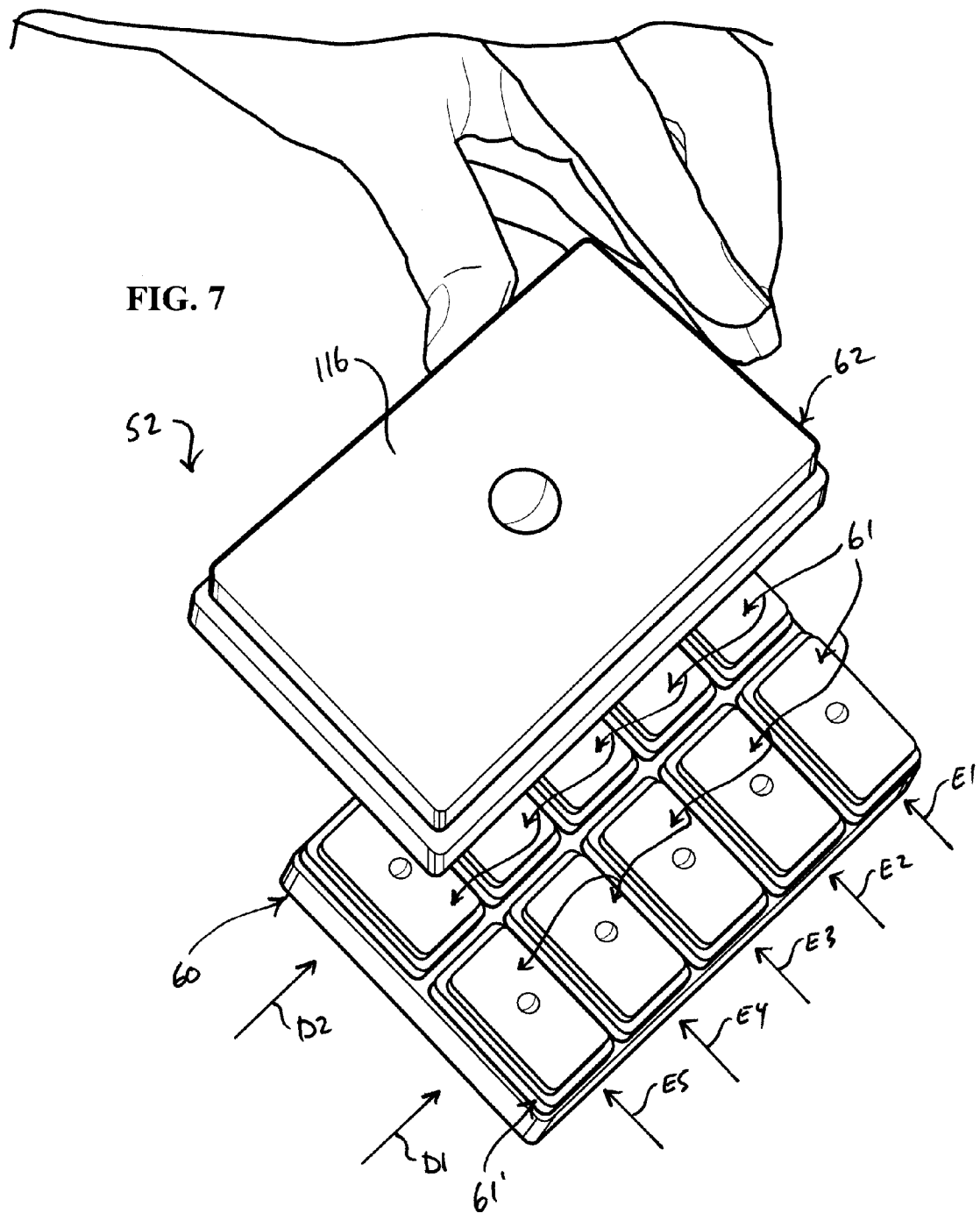
FIG. 7 is a perspective view of a base ten cover shown held proximate to counting tiles positioned on a base ten platform of a mathematical teaching apparatus constructed and arranged in accordance with the principle of the invention.

FIG. 3 illustrates counting tiles 61 each removably received by one of the respective ten receiving elements 80, and FIG. 7 illustrates ten counting tiles 61 removably received by the respective receiving elements 80 (not shown in FIG. 7) so as to be removably positioned upon base ten platform 60 thereby arranging the ten counting tiles 61 in the pattern of the ten receiving elements 80 as denoted by rows A1, A2, and B1-B5 denoted in FIG. 1. As previously discussed, the preferred pattern of the ten receiving elements 80 of base ten platform 60 is, according to the principle of the invention, opposite parallel rows A1 and A2 of five of the receiving elements 80, wherein the ten counting tiles 61 removably received by the respective ten receiving elements 80 are arranged in, as referenced in FIG. 7, two corresponding opposite parallel rows of five of the counting tiles 61 according to the pattern of the ten receiving elements 80, which two opposite parallel rows of counting tiles 61 are identified by arrowed lines D1 and D2. Rows D1 and D2 of counting tiles 61 identified in FIG. 7 correspond to rows A1 and A2 of receiving elements 80 identified in FIG. 1. Because rows D1 and D2 are opposite and parallel with respect to each other as shown in FIG. 7, the pattern of counting tiles 61 received by base ten platform 60 also forms five parallel rows of two opposite counting tiles 61, which five rows of two opposite counting tiles 61 are identified by arrowed lines E1-E5, and which are transverse with respect to rows D1 and D2, and this structural arrangement is clearly shown in FIG. 7. Rows E1-E5 of two opposite counting tiles 61 corresponds to rows B1-B5 of receiving elements 80 identified in FIG. 1. As such, installation of counting tiles 61 on base ten platform 60 with respect to the corresponding receiving elements 80 arranges tiles in a pattern representing factors of the fundamental numerical value of ten, which pattern includes two opposite parallel rows D1 and D2 of five counting tiles 61, and five opposite parallel rows E1-E5 of two counting tiles 61, according to the principle of the invention.

Any number of counting tiles 61 between one and ten can be installed on base ten platform 60. When a counting tile 61 is installed on base ten platform 60, it represents the numerical factor of one at the ones position of a number. In this regard, installation of one counting tile 61 on base ten platform 60 would represent the numerical value of one at the ones position of a number, installation of two counting tiles 61 on base ten platform 60 would represent the numerical value of two at the ones position of a number, installation of three counting tiles 61 on base ten platform 60 would represent the numerical value of three at the ones position of a number, etc.

Referencing FIGS. 1-3, base ten cover 62 is broad and generally flat and substantially rectangular in shape, and is substantially coextensive with respect to base ten platform 60. Like base ten platform 60, each counting tile 61 is considerably smaller in size compared to base ten cover 62 and is, more particularly, approximate one-tenth the size of base ten cover 62. As best illustrated in FIG. 3, base ten cover 62 includes a horizontal main panel 110 having opposed, parallel, and planar upper and lower surfaces 111 and 112, a perimeter edge 113, and a continuous sidewall 114 depending downwardly from perimeter edge 113 and lower surface 112 terminating with a continuous lower edge 115. Upper surface 111 is formed with a head 116, which is a broad upstanding projection that is flat and generally rectangular in shape and that extends upwardly from and with respect to upper surface 111 of main panel 110. Continuous sidewall 114 has an outer surface 114A and an opposed inner surface 114B. A receiving area, depression, or socket 117 is formed in base ten cover 62, which is formed by and between lower surface 112 of main panel 110 and inner surface 114B of sidewall 114. Receiving area 116 is generally rectangular in shape.

Base ten cover 62 is installed onto ten counting tiles 61 installed on base ten platform 60. Base ten cover 62 forms part of base ten counting unit 52'. To install base ten cover 62 onto counting tiles 61 positioned on base ten platform 60, base ten cover 62 is positioned opposite to counting tiles 61 positioned on base ten platform 60 as shown in FIG. 7 registering receiving area 117 (not shown in FIG. 7) of base ten cover 62 with the counting tiles 61. Base ten cover 62 is then moved downwardly toward counting tiles 61 applying heads 100 of counting tiles into receiving area 117 formed in base ten cover 62 as shown in FIG. 3 directing continuous lower edge 115 concurrently upon and against upper surfaces 91 of main panels 90 of counting tiles 61 outward of heads 100. So installed, base ten cover 62 is supported by counting tiles 61, in which lower surface 112 of base ten cover 62 is directed toward and confronts heads 100 of counting tiles 61, and inner surface 114B of continuous sidewall 114 encircles, and is positioned in juxtaposition with respect to, heads 100 of counting tiles 61. To remove base ten cover 62, the foregoing operation of installing base ten cover 62 need only be reversed.

FIG. 2 illustrates base ten counting unit 52' positioned above and exploded with respect to base hundred platform 51, in which base ten platform 60 is positioned above base hundred platform 51, counting tiles 61 are positioned above base ten platform 60, and base ten cover 62 is positioned above counting tiles 61. In the assembly of base ten counting unit 52', the ten counting tiles 61 are removably received by the respective receiving elements 80 formed in upper surface 71 of main panel 70 of base ten platform 60 arranging counting tiles in the pattern established by receiving elements 80 of base ten platform 60 as previously discussed, and base ten cover 62 is removably received upon and supported by the ten counting tiles 61, and this assembly forms base ten counting unit 52', namely, base ten cover 62 removably received upon and supported by the ten counting tiles 61 removably received by the respective ten receiving elements 80 of base ten platform 60. In base ten counting unit 52' shown in FIG. 3, a gap 120 is formed between continuous lower edge 115 of base ten cover 62 and perimeter edge 93 of base ten platform 60 exposing the ten counting tiles 61 therebetween base ten cover 62 and base ten platform 60 allowing them to be seen at gap 120, in accordance with the principle of the invention.

Figure 13:
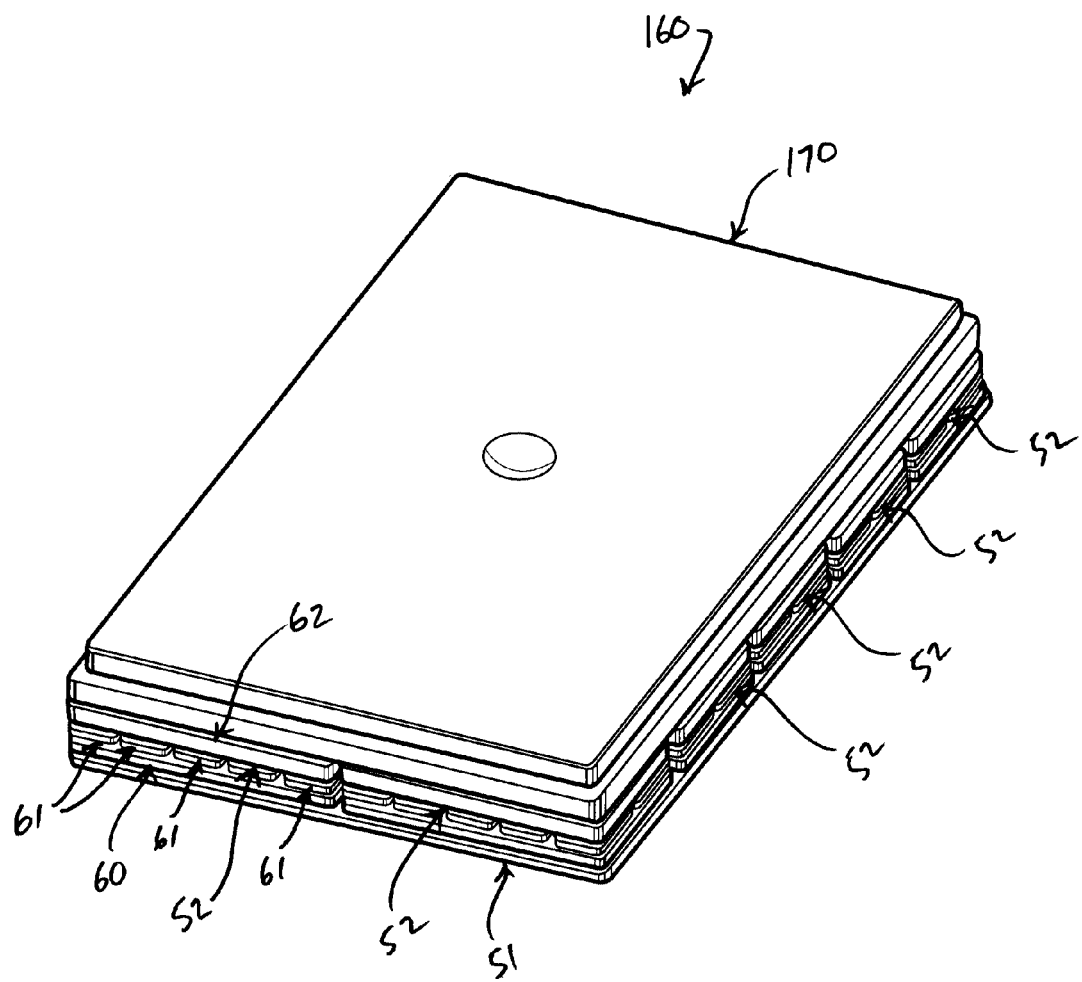
FIG. 13 is a perspective view of the base hundred counting unit of FIG. 12.
Figure 13A:
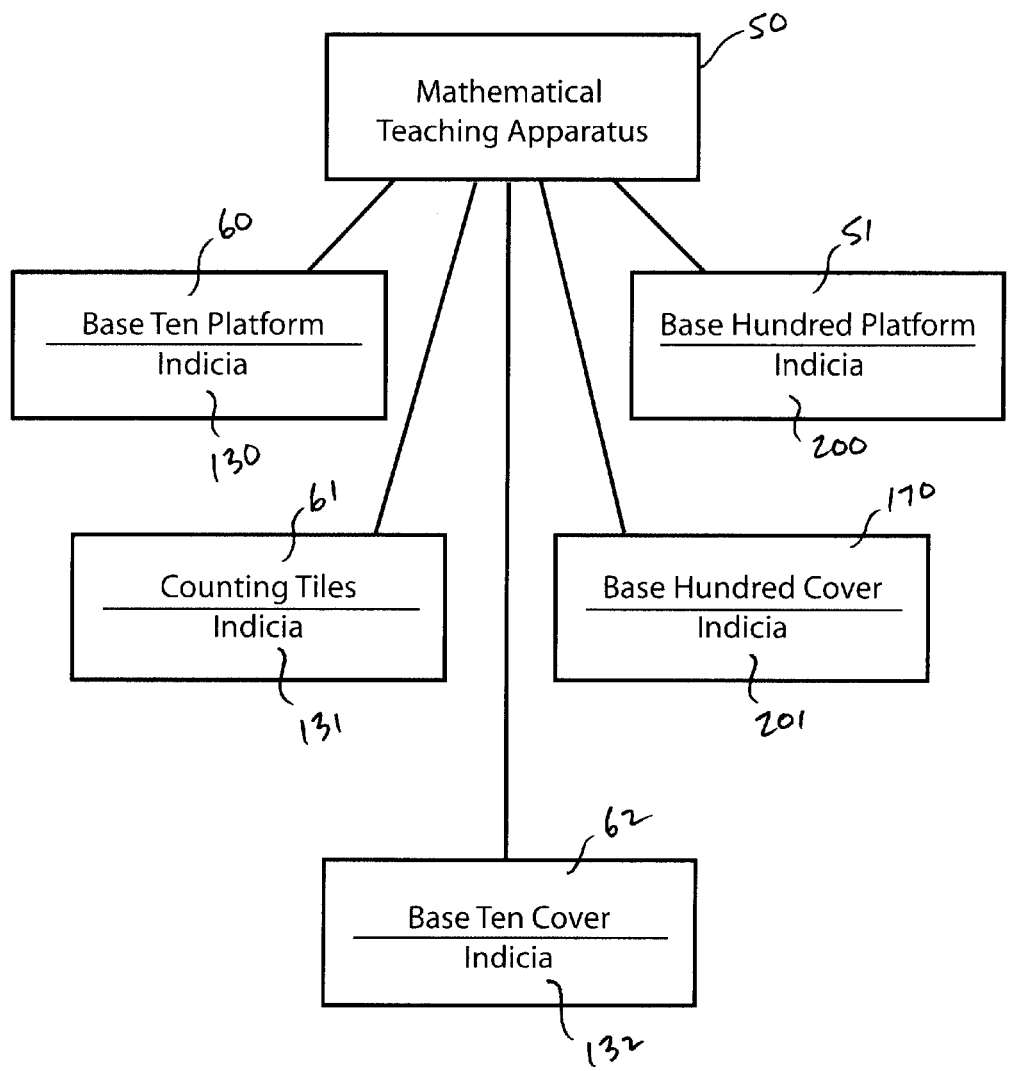
FIG. 13A is a block diagram representation of a mathematical teaching apparatus constructed and arranged in accordance with the principle of the invention.

According to the principle of the invention with particular reference to FIG. 13A, indicia 130 is applied to base ten platform 60 of base ten counting unit 52' identifying base ten platform 60, indicia 131 is applied to each of the ten counting tiles 61 of base ten counting unit 52' identifying each of the ten counting tiles 61, and indicia 132 is applied to base ten cover 62 of base ten counting unit 52' identifying base ten cover 62. According to the principle of the invention, indicia 130 is different from indicia 131 and indicia 132, indicia 131 is different from indicia 130 and 132, and indicia 132 is different from indicia 130 and 131. Indicia 130 of base ten platform 60, indicia 131 of counting tiles 16, and indicia 132 of base ten cover 62 are each readily visible with respect to each other in the assembly of base ten counting unit 52', which allows each of them to be readily viewed and visually identified and visually distinguishable with respect to each other in the assembly of base ten counting unit 52' and which helps in identifying the various elements of base ten counting unit 52' and the patterning of counting tiles 61.

Indicia 130, indicia 131, and indicia 132 are preferably colors, respectively, which are different from one another. Indicia 130 is preferably applied to the entirety of each base ten platform 60, indicia 131 is preferably applied to the entirety of each counting tile 61, and indicia 132 is preferably applied to the entirety of each base ten cover 62. In a particular embodiment, the color of indicia 130 of base ten platform 60 is yellow, the color of indicia 131 of counting tiles 61 is orange, and the color of indicia 132 of base ten cover 62 is blue. Any colors may be incorporated in indicia 130, indicia 131, and indicia 132, so long as they are each different from one another. The colors forming the indicia of base ten platform 60, counting tiles 61, and base ten cover 62 are preferably applied by painting. In an alternate embodiment, the colors forming the indicia may be provided by forming base ten platform 60, counting tiles 61, and base ten cover 62 with different colored plastic.

As previously mentioned, apparatus 50 incorporates ten base ten counting units 52, each of which is adapted to be removably received by base hundred platform 51 as shown in FIG. 8. Base hundred platform 51 is formed of plastic or other strong, resilient material or combination of materials, and is each preferably integrally formed, such as through molding or machining. Base hundred platform 51 is broad and generally flat and substantially rectangular in shape, and is substantially identical in structure with respect to each base ten platform 60 with the exception that base hundred platform 51 is approximately ten times larger than each base ten platform 60 of each base ten counting unit 52. Referencing FIGS. 1 and 3 in relevant part, base hundred platform 51 includes a horizontal main panel 140 having opposed, parallel, and planar upper and lower surfaces 141 and 142, a perimeter edge 143, and a continuous sidewall 144 depending downwardly from perimeter edge 143 and lower surface 142 terminating with a continuous lower edge 145 adapted to be received upon a support surface, such as a table or mat or other platform. Continuous sidewall 144 has an outer surface 144A and an opposed inner surface 144B. Upper surface 141 of main panel 140 is formed with receiving elements each denoted 150. Receiving elements 150 are substantially equal in size and shape, and, in the present embodiment, are upstanding projections that are broad and flat and generally rectangular in shape and that extend upwardly from and with respect to upper surface 141 of main panel 140 each terminating with an outer end or extremity 151. Receiving elements 150 each have a perimeter outer surface 152 extending between upper surface 141 of main panel 140 and upper end 151, and a recess 153 is formed in outer perimeter surface 151 of each receiving element 150.

Receiving elements 150 are substantially equally spaced apart and formed and arranged in a planar array and in a pattern as shown, and are each adapted to removably receive one base ten counting unit 52 to arrange the ten base ten counting units 52 in the pattern of receiving elements 150. Base hundred platform 51 has ten receiving elements 150, and each receiving element 150 is a designated position for a base ten counting unit 52, which, when applied to base hundred platform 51 at one of receiving elements 150 represents a numerical factor of ten. The pattern of the ten receiving elements 150 represents factors of the fundamental numerical value of ten provided by apparatus 50. The preferred pattern of the ten receiving elements 150 of base hundred platform 51 representing factors of ten is, according to the principle of the invention, to opposite parallel rows of five of the receiving elements 150, wherein the ten base ten counting units 52 removably received by the respective ten receiving elements 150 are arranged by base hundred platform 51 in corresponding two opposite parallel rows of five of the base ten counting units 52 according to the pattern of the ten receiving elements 150. As a matter of identifying the pattern of receiving elements 150 of base hundred platform 51 as illustrated in FIG. 1, the rows of five receiving elements 150 are denoted at arrowed lines F1 and F2, respectively. Because rows F1 and F2 are opposite and parallel with respect to each other, the pattern of the receiving elements 150 of base hundred platform 51 also forms five parallel rows of two opposite receiving elements 150, which five rows of two opposite receiving elements 150 are identified by arrowed lines G1-G5, and which are transverse with respect to rows F1 and F2, and this structural arrangement is clearly shown in FIG. 1. According to the principle of the invention, the five parallel rows G1-G5 of two opposite receiving elements 150 each represent a factor of ten being the fundamental numerical element of value of apparatus 50.

Figure 9:
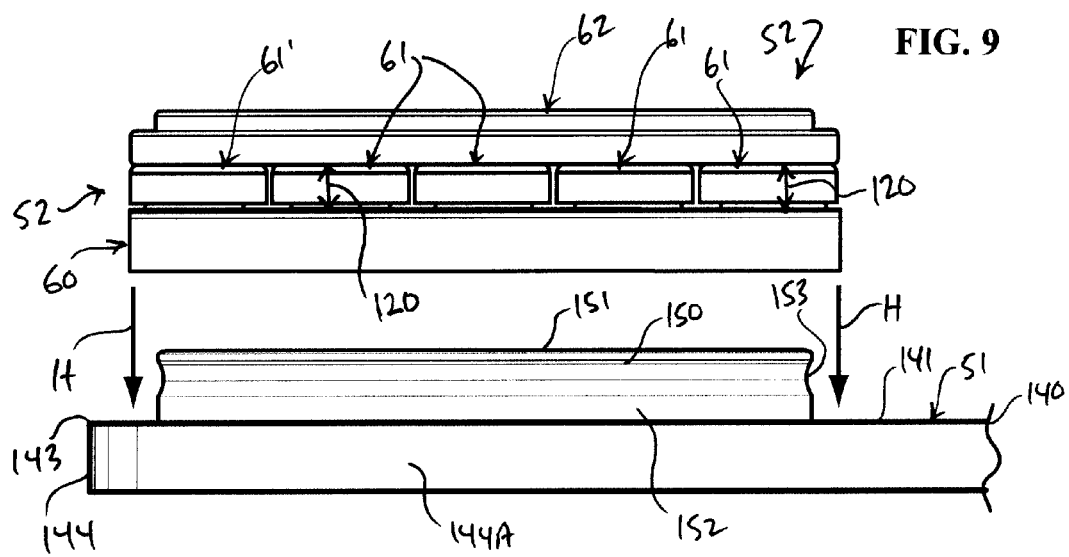
FIG. 9 is an enlarged fragmented side elevation view of a base hundred platform illustrating a receiving element formed in the base hundred platform and a base ten counting unit positioned apart from the receiving element prior to installation with respect to the receiving element of the base hundred platform.

To install base ten counting unit 52' onto base hundred platform 51, base ten counting unit 52' is positioned opposite to one of the receiving elements 150 formed in upper surface 141 of main panel 140 of base hundred platform 51 as shown in FIG. 9 registering receiving area 85 (not shown in FIG. 9) of base ten platform 60 with the corresponding receiving element 150. Receiving area 85 of base ten platform 60 is generally rectangular in shape and is, moreover, substantially commensurate in shape with respect to each receiving element 150 formed in base hundred platform 51 and is sized to receive therein each receiving element 150 formed in base hundred platform 51. In continuing with the installation, base ten platform 60 is then moved downwardly in the direction indicated by arrowed lines H in FIG. 9 toward receiving element 150 applying the corresponding receiving element 150 into receiving area 85 formed in base ten platform 60 as shown in FIG. 3 and directing continuous lower edge 75 upon and against upper surface 141 of main panel 140 of base hundred platform 51. So installed, base ten platform 60, and counting tiles 61 and base ten cover 62 carried by base ten platform 60, is supported by base hundred platform 51, in which lower surface 72 of base ten platform 60 is directed toward and confronts outer end 151 of the corresponding receiving element 150, inner surface 74B of continuous sidewall 74 encircles, and is positioned in juxtaposition with respect to, perimeter outer surface 152 of the corresponding receiving element 150, and detent 76 formed in inner surface 74B of continuous sidewall 74 is registered with and received by recess 153 formed in perimeter outer surface 152 of the corresponding receiving element 150 thereby snappingly and captively retaining base ten platform 60 to the corresponding receiving element 150 as illustrated in FIG. 3. To remove base ten platform 60 from the corresponding receiving element 150 to detach base ten counting unit 52' from the corresponding receiving element 150 of base hundred platform 51, base ten platform 60 need only be taken up, such as by hand, and pulled away from the corresponding receiving element 150 to detach detent 76 from recess 153 and separate base ten platform 60 from base hundred platform 51.

Detent 76 and recess 153 form a detent engagement pair between base ten platform 60 of base ten counting unit 52' and the corresponding receiving element 150 operable for detachably securing base ten platform 60 of base ten counting unit 52' to the corresponding receiving element 150. Detent 76 forms an element of the detent engagement pair, and the corresponding recess 153 forms the complementing element of the detent engagement pair. Although detent 76 is formed in base ten platform 60 of base ten counting unit 52' and the corresponding recess 153 is formed in the corresponding receiving element 150, this arrangement or positioning can be reversed.

FIG. 8 illustrates ten base ten counting units 52, including base ten counting unit 52', removably received by the respective receiving elements 150 (not shown in FIG. 7) so as to be removably positioned upon base hundred platform 51 thereby arranging the ten base ten counting units 52, including base ten counting unit 52', in the pattern of the ten receiving elements 150 as denoted by rows F1, F2, and G1-G5 denoted in FIG. 1. As previously discussed, the preferred pattern of the ten receiving elements 15 of base hundred platform 51 is, according to the principle of the invention, opposite parallel rows F1 and F2 of five of the receiving elements 150, wherein the ten base ten counting units 52 removably received by the respective ten receiving elements 150 are arranged in, as referenced in FIG. 7, two corresponding opposite parallel rows of five of the base ten counting units 52 according to the pattern of the ten receiving elements 150, which two opposite parallel rows of base ten counting units 52 are identified by arrowed lines I1 and I2. Rows I1 and I2 of base ten counting units 52 identified in FIG. 7 correspond to rows F1 and F2 of receiving elements 150 identified in FIG. 1. Because rows I1 and I2 are opposite and parallel with respect to each other as shown in FIG. 7, the pattern of base ten counting units 52 received by base hundred platform 51 also forms five parallel rows of two base ten counting units 52, which rows of five base ten counting units 52 are identified by arrowed lines J1-J5, and which are transverse with respect to rows I1 and I2, and this structural arrangement is clearly shown in FIG. 7. Rows J1-J5 of two opposite base ten counting units 52 corresponds to rows G1-G5 of receiving elements 150 identified in FIG. 1. As such, installation of base ten counting units 52 on base hundred platform 51 with respect to the corresponding receiving elements 150 arranges base ten counting units 52 in a pattern representing factors of the fundamental numerical value of ten, which pattern includes two opposite parallel rows I1 and I2 of five base ten counting units 52, and five opposite parallel rows J1-J5 of two base ten counting units 52, according to the principle of the invention. Because each base ten counting unit 52 represents the numerical value of ten, placement of ten base ten counting unit 52 onto base hundred platform 51 forms a base hundred counting unit denoted generally at 160 that represents the numerical value of one hundred. Of course, fewer than ten base counting units 52 may be applied to base hundred platform 51 to form a designated number at the tens position of a number. For instance, installation of nine base ten counting units 52 on base hundred platform 51 would represent the numerical value of ninety at the tens position of a number, installation of eight base ten counting units 52 on base hundred platform 51 would represent the numerical value of eighty at the tens position of a number, installation of seven base ten counting units 52 on base hundred platform 51 would represent the numerical value of seventy at the tens position of a number, etc.

Figure 10:
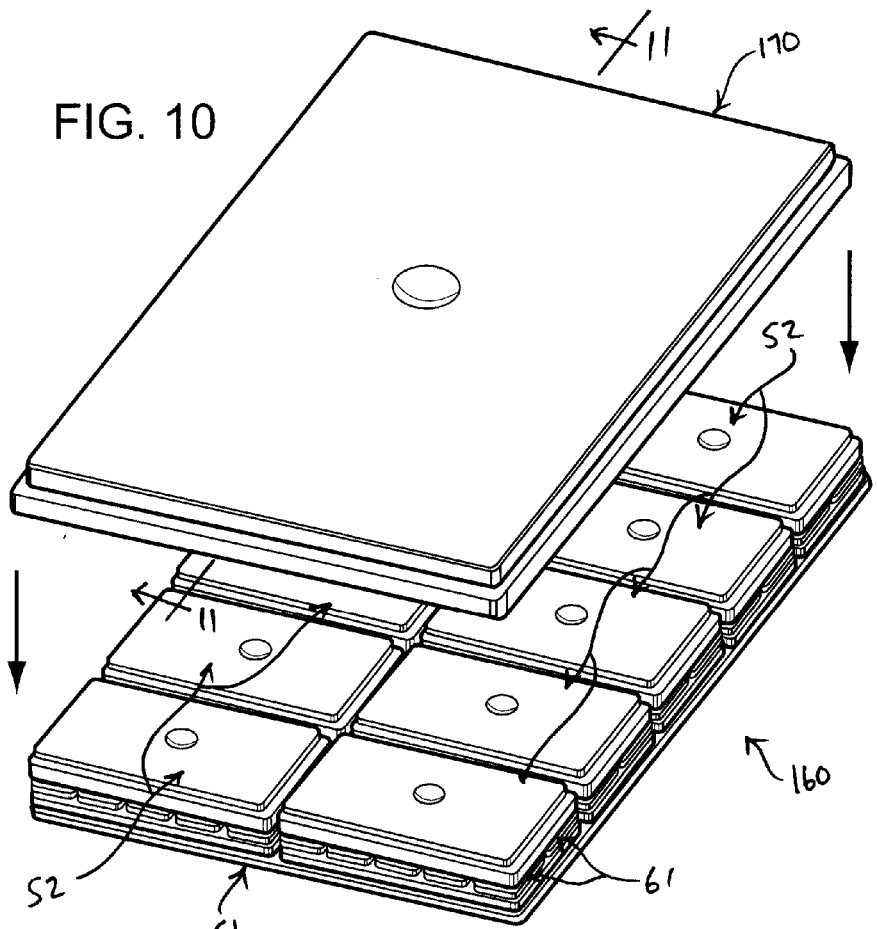
FIG. 10 is a perspective view of is a perspective view of a base hundred cover positioned above a base hundred platform filed with base ten counting units of a mathematical teaching apparatus constructed and arranged in accordance with the principle of the invention.
Figure 11:
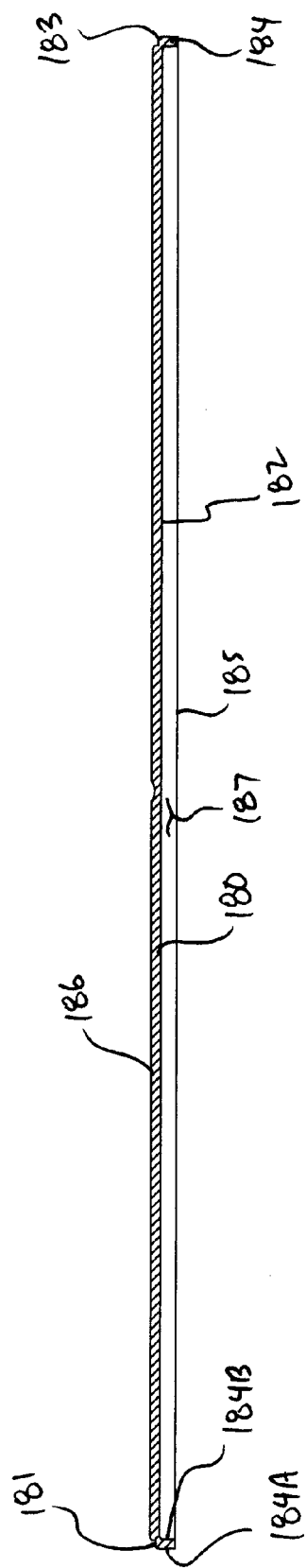
FIG. 11 is a sectional view taken along line 11-11 of FIG. 10.

Referencing FIGS. 10 and 11, apparatus 50 further incorporates a base hundred cover denoted at 170. Base hundred cover 170 is formed of plastic or other strong, resilient material or combination of materials, and is preferably integrally formed, such as through molding or machining. Base hundred cover 170 is broad and generally flat and substantially rectangular in shape, and is substantially coextensive with respect to base hundred platform 51. Like base hundred platform 51, each base ten counting unit 52 is considerably smaller in size compared to base hundred cover 170 and is, more particularly, approximate one-tenth the size of base hundred cover 170. Referencing FIG. 11, base hundred cover 62 includes a horizontal main panel 180 having opposed, parallel, and planar upper and lower surfaces 181 and 182, a perimeter edge 183, and a continuous sidewall 184 depending downwardly from perimeter edge 183 and lower surface 182 terminating with a continuous lower edge 185. Upper surface 181 is formed with a head 186, which is a broad upstanding projection that is flat and generally rectangular in shape and that extends upwardly from and with respect to upper surface 181 of main panel 180. Continuous sidewall 184 has an outer surface 184A and an opposed inner surface 184B. A receiving area, depression, or socket 187 is formed in base hundred cover 62, which is formed by and between lower surface 182 of main panel 180 and inner surface 184B of sidewall 184. Receiving area 187 is generally rectangular in shape.

Figure 12:
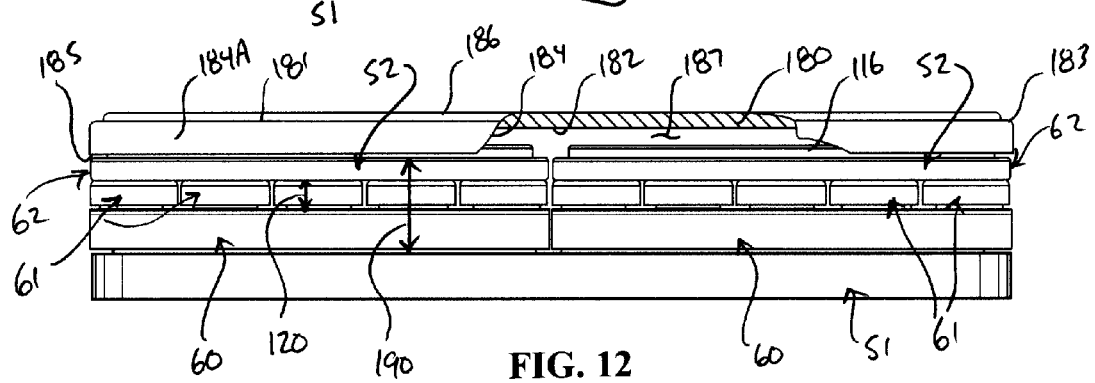
FIG. 12 is an end elevation view of a base hundred cover positioned atop base ten counting units installed on a base hundred platform forming a base hundred counting unit of a mathematical teaching apparatus constructed and arranged in accordance with the principle of the invention, with portions thereof being broken away for illustrative purposes.

Base hundred cover 170 is installed onto ten base ten counting units 52 installed on base hundred platform 51, and when so installed forms part of base hundred counting unit 160. To install base hundred cover 170 onto base ten counting units 52, base hundred cover 170 is positioned opposite to base ten counting units 52 positioned on base ten platform 60 as shown in FIG. 10 registering receiving area 187 (not shown in FIG. 10) of base hundred cover 170 with the base ten counting units 52. Base hundred cover 170 is then moved downwardly toward base ten counting units 52 in the direction indicated by arrowed lines K applying, as seen in FIG. 12, heads 116 of base ten covers 62 into receiving area 187 formed in base hundred cover 170 directing continuous lower edge 185 concurrently upon and against upper surfaces 111 of main panels 110 of base ten covers 62 of base ten counting units 52 outward of heads 100 as shown in FIG. 12 and also FIG. 13. So installed, base hundred cover 170 is supported by base ten covers 62 of base ten counting units 52, in which lower surface 182 of base hundred cover 170 is directed toward and confronts heads 116 of base ten covers 62 of base ten counting units 52, and inner surface 184B (FIG. 11) of continuous sidewall 184 encircles, and is positioned in juxtaposition with respect to, heads 116 of base ten covers 62 of base ten counting units 52. To remove base hundred cover 170, the foregoing operation of installing base hundred cover 170 need only be reversed. Again, base hundred cover 170 removably positioned upon and supported by the ten base ten covers 62 of the ten base ten counting units 52 positioned on base hundred platform 51 forms a part of base hundred counting unit 160 as further shown in FIGS. 12 and 13.

Base hundred counting unit 160 represents the numerical value of one hundred, as previously discussed. In base hundred counting unit 160 shown in FIGS. 12 and 13, a gap 190 is formed between continuous lower edge 185 of base hundred cover 170 and perimeter edge 143 of hundred platform 51 exposing the ten base ten counting units 52 therebetween base hundred cover 170 and base hundred platform 51 allowing base ten counting units 52 to be seen at gap 190 in the assembly of base hundred counting unit 160.

According to the principle of the invention with particular reference to FIG. 13A, indicia 200 is applied to base hundred platform 51 of base hundred counting unit 160 identifying base hundred platform 51, and indicia 201 is applied to base hundred cover 170 of base hundred counting unit 160 identifying base hundred cover 170. According to the principle of the invention, indicia 200 is different from indicia 201 and also indicia 130, indicia 131, and indicia 132, and indicia 201 is different from indicia 200 and also indicia 130, indicia 131, and indicia 132. Indicia 130 of base ten platform 60, indicia 131 of counting tiles 16, and indicia 132 of base ten cover 62 of base ten counting units 52 are each readily visible with respect to each other at gap 190 in the assembly of base hundred counting unit 160, as is indicia 200 of base hundred platform 51 and indicia 201 of base hundred cover 170 on either side of gap 190, which allows each of them to be readily viewed and visually identified and visually distinguishable with respect to each other in the assembly of base hundred counting unit 160.

Indicia 200 and indicia 201 are preferably colors, respectively, which are different from one another. Indicia 200 is preferably applied to the entirety of base hundred platform 51, and indicia 201 is preferably applied to the entirety of base hundred cover 170. In a particular embodiment, the color of indicia 200 of base hundred platform 51 is white, and the color of indicia 201 of base hundred cover 170 is red, and are each, therefore, different from the colors of indicia 130, indicia 131, and indicia 132. Any colors may be incorporated in indicia 200, and indicia 201, so long as they are different from each other and different from indicia 130, indicia 131, and indicia 132. The colors forming the indicia of base hundred platform 51 and base hundred cover 170 are preferably applied by painting. In an alternate embodiment, the colors forming the indicia may be provided by forming base hundred platform 51 and base hundred cover 170 with different colored plastic.

Apparatus 50 is a unique manipulative system that is useful in representing hundreds, tens, and ones number value structure, qualities, relationships, and applications. Base ten counting units 52 are uniquely arranged with ten counting tiles 61 organized in factors of ten including two rows A1 and A2 of five counting tiles 61 that, it turn, form five rows B1-B5 of two opposite counting tiles 61. The pattern arrangement of counting tiles 61 on base ten platform 60 visually represents factors of ten, according to the principle of the invention and this provides number pattern recognition at the ones position of a number. Base ten platform 60 is not a counting unit, but serves to organize counting tiles 61 in the described pattern at the ones position of a number. For any number, the number of counting tiles 61 occupying a base ten platform 60 corresponds to the ones digit of a number, and the number of base ten counting units 52 occupying base hundred platform 51 corresponds to the tens digit of the number. The collective look and appearance of counting tiles 61 positioned on base ten platform 60, and base ten counting units 52 positioned on base hundred platform 51, represents the value of that particular number, the tens and ones pattern of the number, and the patterns of tens and ones value as denoted by the patterns of the base hundred platform 51 and the base ten platform 60, which patterns are centered around factors of ten being a fundamental numerical value according to the principle of the invention.

Figure 14:
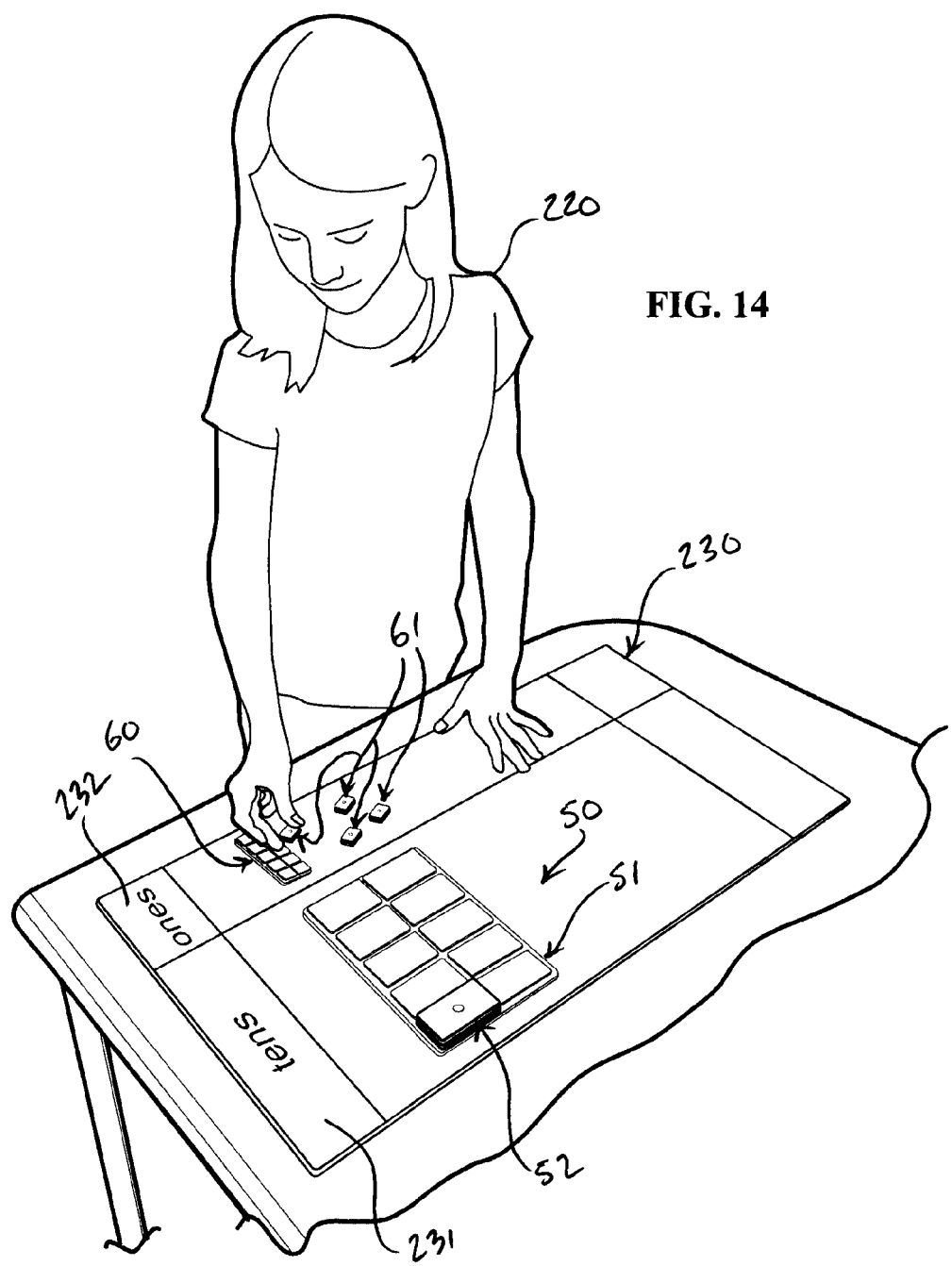
FIG. 14 is a perspective view of a mathematical teaching apparatus constructed and arranged in accordance with the invention shown as it would appear in use in conjunction with a patterning platform.
Figure 15:
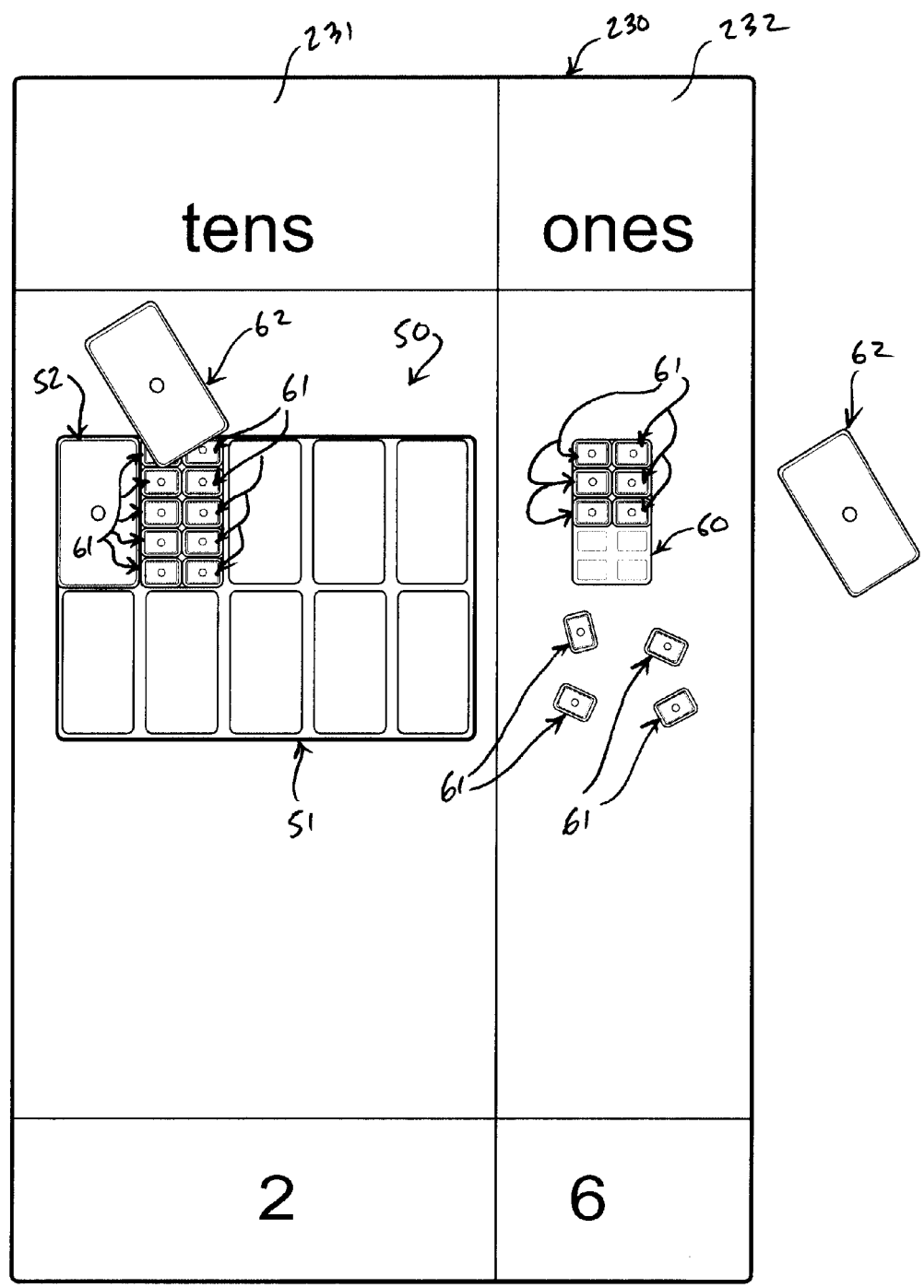
FIG. 15 a top plan view of a mathematical teaching apparatus constructed and arranged in accordance with the invention shown as it would appear in use in conjunction with the patterning platform of FIG. 13.

For instance, apparatus 50 is useful in forming and arranging numbers and patterns of numbers as seen in FIGS. 14 and 15. In forming numbers with apparatus 50, the sum of each base ten counting unit 52 applied to base hundred platform 51 and each counting tile 61 applied to a base ten platform 60 represents a number having a tens and ones placement value. The ability to position base ten counting units 52 on base hundred platform 51 and to position counting tiles 61 on base ten platform 60 also allows the pattern of a number having a tens and ones place value to be visually perceived. Placement of base ten counting units 52 onto base hundred platform 51 to form a tens value of a number can demonstrate the pattern of tens units at the tens placement value of a number. Likewise, placement of counting tiles 61 onto base ten platform 60 to form a ones value of a number can demonstrate the pattern of ones units at the ones placement value of a number.

Furthermore, each formed base ten counting unit 52 can be applied to base hundred platform 51 to represent the numerical value of ten at a tens value placement of a number, and base ten platforms 60 not formed into base ten counting units 52 are useful in receiving counting tiles 61 to represent numerical values of nine or less at a ones value placement of a number. For instance, in FIG. 14 base ten counting unit 52 is applied to base hundred platform 51 thereby representing the number 10 at the tens value placement of a number, and a child 220 is in the process of installing one counting tile 61 onto an opposed base ten platform 60 to represent the number one at the ones value placement of a number thereby forming the number eleven. In FIG. 15, as a matter of example, one base ten counting unit 52 is positioned on base hundred platform 51 and another base ten counting unit 52 shown as it would appear in the process of being positioned on base hundred platform 50 that together form the number twenty at the tens value placement of a number, and six counting tiles 61 are applied onto the adjacent base ten platform 60 to represent the number six at the ones value placement of a number thereby forming the number twenty six.

Figure 16:
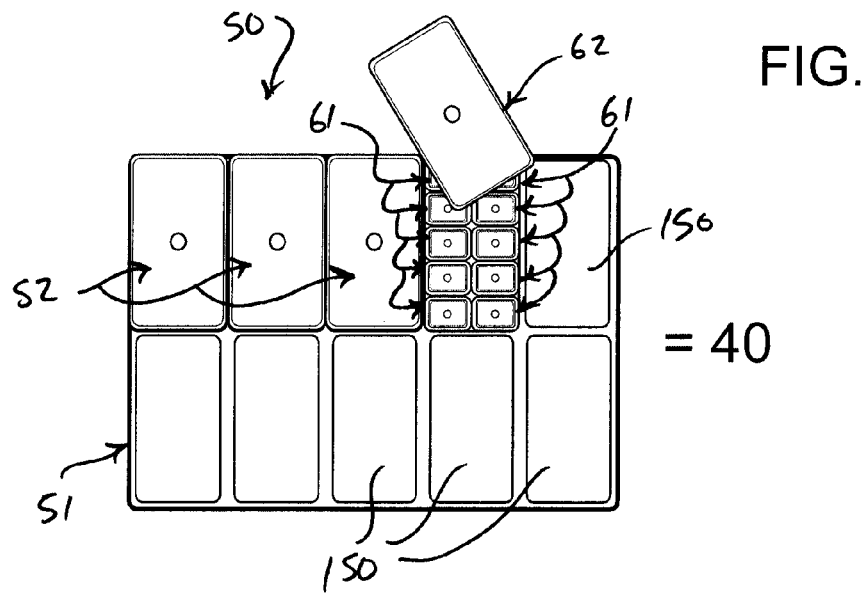
FIG. 16 is a top plan view of three base ten counting units positioned on a base hundred platform of a mathematical teaching apparatus constructed and arranged in accordance with the principle of the invention, and a base ten counting unit shown as it would appear in the process of being positioned on the base hundred platform.
Figure 17:
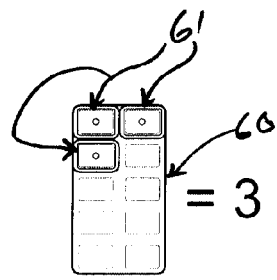
FIG. 17 is a top plan view of a three counting tiles positioned on a base ten platform of a mathematical teaching apparatus constructed and arranged in accordance with the principle of the invention.
Figure 18:
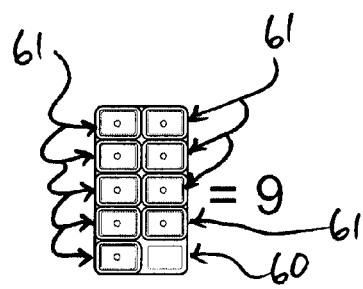
FIG. 18 is a top plan view of a nine counting tiles positioned on a base ten platform of a mathematical teaching apparatus constructed and arranged in accordance with the principle of the invention.

In FIGS. 14 and 15 there is shown a patterning platform 230 formed with a tens placement column denoted at 231 onto which the base hundred platform 51 is positioned, and an opposed ones placement column denoted at 232 onto which base ten platform 60 is positioned. The tens column 231 is appropriately labeled "tens" and the ones column 232 is appropriately labeled "ones" to ensure accurate placement of base ten counting units 52 in the tens column 231 and counting tiles 61 in the ones column 232. The provision of patterning platform 220 assists a user in understanding tens placement and ones placement. As a matter of further examples, in FIG. 16 there are three base ten counting units 52 positioned on base hundred platform 51 and another base ten counting unit 52 shown as it would appear in the process of being positioned on base hundred platform 51 that together form the number forty at the tens value placement of a number, FIG. 17 illustrates three counting tiles 61 applied onto one base ten platform 60 to represent the number three at the ones value placement of a number, and FIG. 18 illustrates nine counting tiles 61 applied onto one base ten platform 60 to represent the number nine at the ones value placement of a number.

Apparatus 50 is, accordingly, useful in promoting integrated mathematics instruction in place value. Though the manipulation of base ten counting units 52, such as by adding and taking away base ten counting units 52 and/or counting tiles 16, apparatus is also useful in teaching addition, subtraction, multiplication, division, and values of currency. Place value concepts are developed with the application of counting tiles 61 on base ten platforms 60, and through the application of base ten counting units 52 onto base hundred platforms 51. The unique spatial representation of each number of counting tiles 61 on a corresponding base ten platform 60 gives a numerical meaning and look to the associated numeral and the representations of the look of multiples of ten, which include two multiples five counting tiles 61 as provided by rows A1 and A2 of receiving elements 80, and five multiples of two counting tiles 61 as provided by rows B1-B5. Likewise, the unique spatial representation of each number of base ten counting units 52 on a corresponding base hundred platform 51 gives a numerical meaning and look to the associated numeral and the representations of the look of multiples of one hundred, which include two multiples five base ten counting units 52 as provided by rows F1 and F2 of receiving elements 150, and five multiples of two base ten counting units 52 as provided by rows G1-G5. Moreover, base ten platforms 60 are each useful in teaching how to count by ones through the placement of counting tiles 61 on a base ten platform 60 to form ones numbers, and base hundred platforms 51 are useful in teaching how to count by tens and to form tens numbers through the placement of base ten counting units 52 on base hundred platform 51.

When filling up receiving elements 80 of base ten platform 60 with counting tiles 61 to form ones numbers and ones numbers consisting of multiples of ten, counting tiles 61 may be filled in from row A1 to row A2 of receiving elements 80 or from row A2 to row A1 of receiving elements 80, whereby rows A1 and A2 of receiving elements 80 each represent a pattern consisting of a factor of five of the fundamental numerical value of ten. Alternatively, when filling up receiving elements 80 of base ten platform 60 with counting tiles 61 to form ones numbers and ones numbers consisting of multiples of ten, counting tiles 61 may be filled in from row B1 to row B5 of receiving elements 80 or from row B5 to row B1 of receiving elements 80, whereby rows B1-B5 of receiving elements 80 each represent a pattern consisting of a factor of two of the fundamental numerical value of ten. Rows A1, A2, and B1-B5 can be filed in sequence either from the left to the right or the right to the left as may be desired. When filling up receiving elements 150 of base hundred platform 51 with base ten counting units 52 to form tens numbers and tens numbers consisting of multiples of ten, base ten counting units 52 may be filled in from row F1 to row F2 of receiving elements 150 or from row F2 to row F1 of receiving elements 150, whereby rows F1 and F2 of receiving elements 150 each represent a pattern consisting of a factor of five of the fundamental numerical value of ten. Alternatively, when filling up receiving elements 150 of base hundred platform 51 with base ten counting units 52 to form tens numbers and tens numbers consisting of multiples of ten, base ten counting units 52 may be filled in from row G1 to row G5 of receiving elements 150 or from row G5 to row G1 of receiving elements 150, whereby rows G1-G5 of receiving elements 150 each represent a pattern consisting of a factor of two of the fundamental numerical value of ten. Rows F1, F2, and G1-G5 can be filed in sequence either from the left to the right or the right to the left as may be desired.

As a matter of illustration and reference, FIG. 19 illustrates a patterning platform 240 formed with a hundreds placement column denoted at 241 onto which multiple base hundred counting units 160 may be placed, an opposed tens placement column denoted at 242 onto which the base hundred platform 51 may be positioned to receive base ten counting units 52, and an opposed ones placement column denoted at 242 onto which base ten platform 60 may positioned to receive counting tiles 61. These columns provide numerical placement values for a number including a hundreds component, a tens, component, and a ones component, and formation of such a number can be formed through the placement of multiple base hundred counting units 160 at column 241, base ten counting units 52 placed at column 242, and counting tiles 61 placed at column 243. The hundreds column 241 is appropriately labeled "hundreds" to ensure accurate placement of base hundred counting units 160 at column 241, the tens column 242 is appropriately labeled "tens" to ensure accurate placement of base ten counting units 52 at column 242, and the ones column 243 is appropriately labeled "ones" to ensure accurate placement of counting tiles 61 at column 243. The provision of patterning platform 240 assists a user in understanding hundreds, tens, and ones placement. In FIG. 19 as a matter of example, there are five base hundred counting units 160 in hundreds placement column 241 representing the number 500 at the hundreds placement, there are two base ten counting units 52 at tens placement column denoted 242 representing the number 20 at the tens placement, and there are nine counting tiles 61 at ones placement column 242 representing the number 9 at the ones placement, thereby forming the number 529.

And so apparatus 50 illustrates the power-of-ten at the hundreds, tens, and ones positions of numbers to allow a student to experience the base ten number system physically, to recognize the unique spatial configuration of every quantity from 0-10, to see that every place in the system has a potential 0-10 configuration (0-10 tens, 0-10 hundreds, etc.), to make numerical decisions by referring to their visual memory of 0-10 configurations, and to model and learn patterns of ten at the ones position, the tens position, and the hundreds position.

In addition, a student may model the problem on two base ten platforms 60 in the tens place. When the sum, as determined by application of counting tiles 61, of two numbers surpasses nine, they "make a ten" of one addend by taking ones from the other addend and group the ten ones into one ten and move it to the tens place. The sum becomes a ten number interpreted simply as one ten and additional ones. This structured-around-ten approach avoids the need to learn addition facts involving ten sums.

In subtraction a student may model the problem on a base ten platform 60 in the tens place and a base ten platform 60 in the ones place. When the one-digit subtrahend is larger than the ones digit in the minuend, the student can move the ten from the tens place and place it in the ones place. Now they have one ten and additional ones (the subtrahend). They "take from ten" and add the remaining ones to the subtrahend. This structured-around-ten approach avoids the need to learn subtraction facts involving teen minuends.

Multiplication instruction using counting tiles 61 emphasizes a unit interpretation of the multiplicand and uses the base ten platform 60 to help students skip-count and visualize factors. To develop each basic fact (1-9), children stack equivalent counting tile 61 groups on base ten platform 60 and then remove them, one stack at a time, placing the individual counting tiles from the stacks onto another base ten platform 60 in the ones' place of a patterning platform, such as patterning platform 230 in or patterning platform 240 discussed above. As they continue to put counting tiles 61 on the patterning platform, grouping to the tens place as necessary, they see the product increase by the number of counting tiles 61 in the multiplicand and record the accumulated product.

Students also can use counting tiles 61 and base ten platforms 60 to discover that multiplication by ten forces the counting tile 61 configuration on the base ten platform 60 to become that configuration on the base ten platform 60 in the next place to the left, thus causing a related digit shift in the numerical version. Students apply this information to numerical multiplication: every multiplication involving one ten shifts digits in the basic-fact product one place to the left, two tens (or one hundred) two places to the left, etc.

To develop division facts, students reverse the steps they used to develop multiplication facts. Beginning with the dividend modeled on a patterning platform (patterning platform 230 or 240), students remove counting tiles 61 from the base ten platform 60 in the ones place or position and place them, in stacks defined by the divisor, onto a base ten platform 60 (in ten-frame order). The location that contains the last stack tells the number of stacks. When a tile-of-ten must be ungrouped to create stacks defined by the divisor, students first place the base ten platform 60 containing ten counting tiles 61 onto the ones place of the patterning platform and divide from there. The same approach is used for all division problems, no matter the magnitude of the divisor and dividend.

The present invention is described above with reference to a preferred embodiment. However, those skilled in the art will recognize that changes and modifications may be made in the described embodiment without departing from the nature and scope of the present invention. For instance, the relative positioning of the receiving elements and receiving areas between the corresponding elements of apparatus 50 can be reversed if so desired, in which each receiving area is considered to be an element of an engagement pair, and each corresponding receiving area is considered to be a corresponding complementing element of such engagement pair. Moreover, it is again emphasized that the relative positioning of the recess and detent of each of the detent engagement pairs can also be reversed, if so desired. Further, the detent and recess of each of the corresponding engagement pairs releasably engage one another as described, and the spacing between the detent and the recess of each of the corresponding detent engagement pairs incorporated in this application is exaggerated for illustrative purposes and ease of illustration and reference. Various changes and modifications to the embodiment herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. Mathematical teaching apparatus, comprising:
    a base ten platform having a perimeter edge and being formed with a planar array of ten receiving elements being substantially equal in size and arranged in a pattern;
    ten counting tiles being substantially equal in size and shape;
    each of the ten receiving elements adapted to removably receive one of the ten counting tiles to arrange the ten counting tiles in the pattern of the ten receiving elements; and
    a base ten cover adapted to be removably positioned against said ten counting tiles received by the respective said ten first receiving elements so as to cover and be supported by the ten counting tiles so as to form a gap between the base ten cover and the perimeter edge of the base ten platform exposing the ten counting tiles received by the respective said ten first receiving elements allowing each of the ten counting tiles to be seen at the gap.

2. The mathematical teaching apparatus according to claim 1, further comprising:
    first indicia applied to the base ten platform identifying the base ten platform;
    second indicia applied to each of the ten counting tiles identifying each of the ten counting tiles;
    third indicia applied to the base ten cover identifying the base ten cover;
    the first indicia different from the second indicia, and the third indicia;
    the second indicia different from the first indicia, and the third indicia; and
    the third indicia different from the first indicia, and the second indicia.

3. The mathematical teaching apparatus according to claim 1, wherein the pattern of the ten receiving elements of the base ten platform comprises opposite parallel rows of five of the receiving elements.

4. The mathematical teaching apparatus according to claim 3, further comprising a detent engagement pair formed between each receiving element and each counting tile to detachably secure each counting tile to a respective receiving element, each detent engagement pair comprising an element of the detent engagement pair carried by each counting tile and a complementing element of the detent engagement pair carried by each receiving element.

5. The mathematical teaching apparatus according to claim 4 wherein the element of the detent engagement pair is one of a recess and a detent, and the complementing element of the engagement pair is the other of the recess and the detent.

6. Mathematical teaching apparatus, comprising:
   a base ten platform having a perimeter edge and being formed with a planar array of ten receiving elements being substantially equal in size and arranged in a pattern;
   ten counting tiles being substantially equal in size and shape;
   a base ten cover;
   each of the ten receiving elements adapted to removably receive one of the ten counting tiles to arrange the ten counting tiles in the pattern of the ten receiving elements;
   the ten counting tiles removably received by the respective ten receiving elements arranging the ten counting tiles in the pattern of the ten receiving elements;
   the base ten cover removably received against the ten counting tiles forming a base ten counting unit comprising the base ten cover removably received against the ten counting tiles removably received by the respective ten receiving elements of the base ten platform, the base ten cover covering and being supported by the ten counting tiles so as to form a gap between the base ten cover and the perimeter edge of the base ten platform exposing the ten counting tiles allowing each of them to be seen at the gap.

7. The mathematical teaching apparatus according to claim 6, further comprising:
   first indicia applied to the base ten platform identifying the base ten platform;
   second indicia applied to each of the ten counting tiles identifying each of the ten counting tiles;
   third indicia applied to the base ten cover identifying the base ten cover;
   the first indicia different from the second indicia, and the third indicia;
   the second indicia different from the first indicia, and the third indicia;
   the third indicia different from the first indicia, and the second indicia; and
   the first indicia of the base ten platform, the second indicia of each of the ten counting tiles, and the third indicia of the base ten cover each readily visible in the base ten counting unit.

8. The mathematical teaching apparatus according to claim 7, wherein the pattern of the ten receiving elements of the base ten platform comprises opposite parallel rows of five of the receiving elements, wherein the ten counting tiles removably received by the respective ten receiving elements are arranged in opposite parallel rows of five of the counting tiles according to the pattern of the ten receiving elements.

9. The mathematical teaching apparatus according to claim 8, further comprising a detent engagement pair formed between each receiving element and each counting tile detachably securing each counting tile to a respective receiving element, each detent engagement pair comprising an element of the detent engagement pair carried by each counting tile engaging a complementing element of the detent engagement pair carried by each receiving element.

10. The mathematical teaching apparatus according to claim 9, wherein the element of the detent engagement pair is one of a recess and a detent, and the complementing element of the engagement pair is the other of the recess and the detent.

11. Mathematical teaching apparatus, comprising:
    ten base ten counting units each comprising:
      a base ten platform having a first perimeter edge and being formed with a first planar array of ten first receiving elements being substantially equal in size and arranged in a pattern,
      ten counting tiles being substantially equal in size and shape,
      a base ten cover,
      each of the ten first receiving elements adapted to removably receive one of the ten counting tiles to arrange the ten counting tiles in the first pattern of the ten first receiving elements,
      the ten counting tiles removably received by the respective ten first receiving elements arranging the ten counting tiles in the first pattern of the ten first receiving elements, and the base ten cover removably received against the ten counting tiles forming a base ten counting unit comprising the base ten cover removably received against the ten counting tiles removably received by the respective ten first receiving elements of the base ten platform, the base ten cover covering and being supported by the ten counting tiles so as to form a first gap between the base ten cover and the first perimeter edge of the base ten platform exposing the ten counting tiles allowing each of them to be seen at the first gap;
    a base hundred platform formed with a second planar array of ten second receiving elements being substantially equal in size and arranged in a second pattern;
    the ten second receiving elements of the base hundred platform each adapted to removably receive the base ten platform of one of the ten base ten counting platforms to arrange the ten base ten counting units in the first pattern of the ten first receiving elements; and
    the ten base ten platforms of the ten base ten counting units removably received by the respective ten second receiving elements of the base hundred platform arranging the ten base ten counting units in the second pattern of the ten second receiving elements of the base hundred platform.

12. The mathematical teaching apparatus according to claim 11, further comprising:
    first indicia applied to each said base ten platform identifying each said base ten platform;
    second indicia applied to each said counting tile identifying each said counting tile;
    third indicia applied to each said base ten cover identifying each said base ten cover;
    the first indicia different from the second indicia, and the third indicia;
    the second indicia different from the first indicia, and the third indicia;
    the third indicia different from the first indicia, and the second indicia; and
    the first indicia of said base ten platform, the second indicia of each said counting tiles, and the third indicia of said base ten cover of each base ten counting unit readily visible in each said base ten counting unit.

13. The mathematical teaching apparatus according to claim 12, further comprising fourth indicia applied to the base hundred platform, the fourth indicia different from the first indicia, the second indicia, and the third indicia.

14. The mathematical teaching apparatus according to claim 13, wherein the first pattern comprises opposite parallel rows of five said first receiving elements, wherein the ten counting tiles removably received by the respective ten first receiving elements of the base ten platform of each said base ten counting unit are arranged in opposite parallel rows of five said counting tiles according to the first pattern of the ten first receiving elements.

15. The mathematical teaching apparatus according to claim 14, wherein the second pattern comprises opposite parallel rows of five said second receiving elements, wherein the ten base ten platforms of the ten base ten counting units removably received by the respective ten second receiving elements of said base hundred platform are arranged in opposite parallel rows of five said base ten counting units according to the second pattern of said ten second receiving elements.

16. The mathematical teaching apparatus according to claim 15, further comprising a first detent engagement pair formed between each said first receiving element and each said counting tile detachably securing each said counting tile to a respective said first receiving element, each said first detent engagement pair comprising a first element of the first detent engagement pair carried by each said counting tile engaging a first complementing element of the first detent engagement pair carried by each said first receiving element.

17. The mathematical teaching apparatus according to claim 16, further comprising a second detent engagement pair formed between each said second receiving element and each said base ten platform detachably securing each said base ten platform to a respective said second receiving element, each said second detent engagement pair comprising a second element of the second detent engagement pair carried by each said base ten platform engaging a second complementing element of the second detent engagement pair carried by each said second receiving element.

18. The mathematical teaching apparatus according to claim 17, further comprising:

the base hundred platform having a second perimeter edge;

a base hundred cover; and the base hundred cover removably positioned against the ten base ten covers of the ten base ten counting units forming a base hundred counting unit comprising the base hundred cover removably received against the ten base ten covers of said ten base ten counting units removably received by the respective ten second receiving elements of the base hundred platform, the base hundred cover covering and being supported by the ten base ten covers of the ten base ten counting units so as to form a second gap between the base hundred cover and the second perimeter edge of the base hundred platform exposing the ten base ten counting units allowing each of them to be seen at the second gap.

19. The mathematical teaching apparatus according to claim 18, further comprising fifth indicia applied to the base hundred cover, the fifth indicia different from the first indicia, the second indicia, the third indicia, and the fourth indicia.

* * * * *